United States Patent
Izumiya

(10) Patent No.: US 7,567,264 B2
(45) Date of Patent: Jul. 28, 2009

(54) COLLOR IMAGE FORMING APPARATUS HAVING MAGNIFICATION CORRECTION FUNCTION

(75) Inventor: Kenji Izumiya, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 239 days.

(21) Appl. No.: 11/438,726

(22) Filed: May 22, 2006

(65) Prior Publication Data

US 2007/0064088 A1    Mar. 22, 2007

(30) Foreign Application Priority Data

Sep. 21, 2005    (JP)    ............... 2005-274553

(51) Int. Cl.
  *B41J 17/00*    (2006.01)
  *B41J 2/435*    (2006.01)

(52) U.S. Cl. ...................... 347/116; 347/249

(58) Field of Classification Search ............... 347/116, 347/232–235, 243, 248–250, 259–261
See application file for complete search history.

(56) References Cited

U.S. PATENT DOCUMENTS

| 6,525,751 B2 * | 2/2003 | Hoover | 347/116 |
|---|---|---|---|
| 6,628,424 B2 | 9/2003 | Sakurai | |
| 6,839,078 B2 * | 1/2005 | Izumiya et al. | 347/249 |
| 6,856,336 B2 * | 2/2005 | Toyoda | 347/116 |
| 2003/0174200 A1 | 9/2003 | Izumiya et al. | |
| 2006/0158712 A1 | 7/2006 | Higashi et al. | |

FOREIGN PATENT DOCUMENTS

| EP | 0 291 738 A1 | 11/1988 |
|---|---|---|
| JP | 09-230273 | 9/1997 |

OTHER PUBLICATIONS

European Search Report for Application No. 06114356.6-2202 mailed Jan. 19, 2007.

* cited by examiner

*Primary Examiner*—Hai C Pham
(74) *Attorney, Agent, or Firm*—Cantor Colburn LLP

(57) ABSTRACT

An image forming apparatus for forming color images may include at least two or more colors, having a function of magnification correction of image size by one page unit, the image forming apparatus including: an image carrier; a polygonal mirror rotator independently provided for each color; and a controller which simultaneously conducts first control for changing rotation speed of the polygonal mirror rotator in order for changing image size in a sub-scanning direction perpendicular to a main scanning direction, and second control for correcting a correction amount for color registration error depending on magnification correction of image size, and for adjusting a rotating phase of the polygonal mirror rotator depending on the corrected correction amount for color registration error.

5 Claims, 19 Drawing Sheets

CONFIGURATION EXAMPLE OF IMAGE WRITING UNIT 3Y FOR Y-COLOR AND ITS PERIPHERAL CIRCUIT

FIG. 1   CONFIGURATION EXAMPLE OF COLOR COPIER 100 AS 1ST EMBODIMENT

FIG. 2 CONFIGURATION EXAMPLE OF CONTROL SYSTEM IN COLOR COPIER 100

CONFIGURATION EXAMPLE OF POLYGON MIRROR DRIVE SYSTEM FOR EACH COLOR IMAGE FORMATION

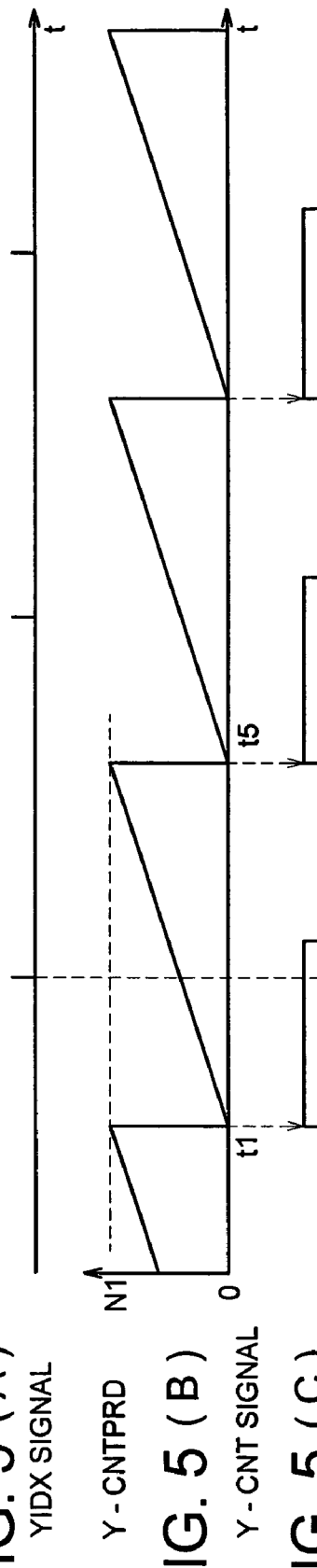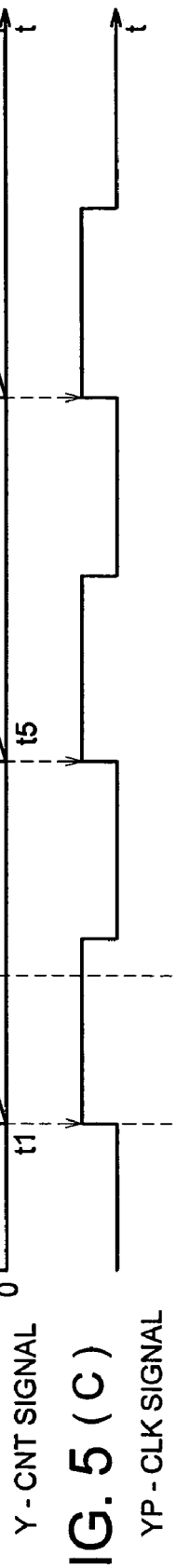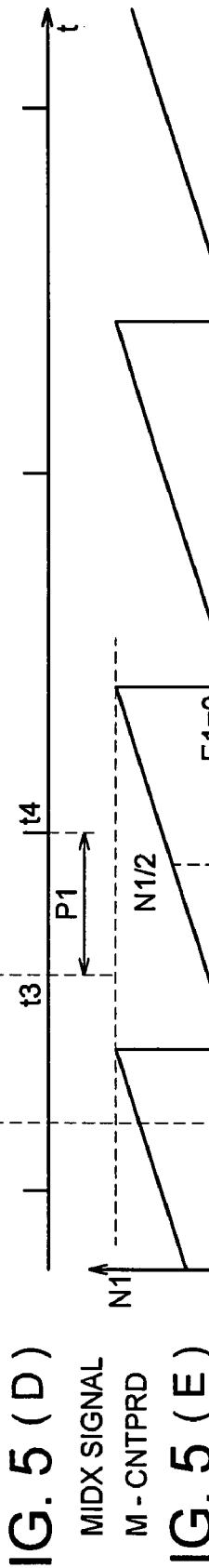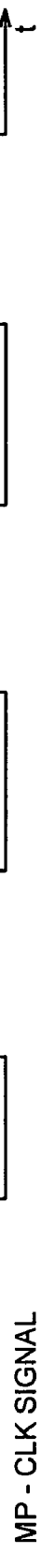
FIG. 5(A) YIDX SIGNAL
FIG. 5(B) Y-CNTPRD Y-CNT SIGNAL
FIG. 5(C) YP-CLK SIGNAL
FIG. 5(D) MIDX SIGNAL M-CNTPRD
FIG. 5(E) M-CNT SIGNAL
FIG. 5(F) MP-CLK SIGNAL
OPERATION EXAMPLE BEFORE MAGNIFICATION CORRECTION CONTROL IN IMAGE FORMING SECTION (YP-CLK SIGNAL BASIS)

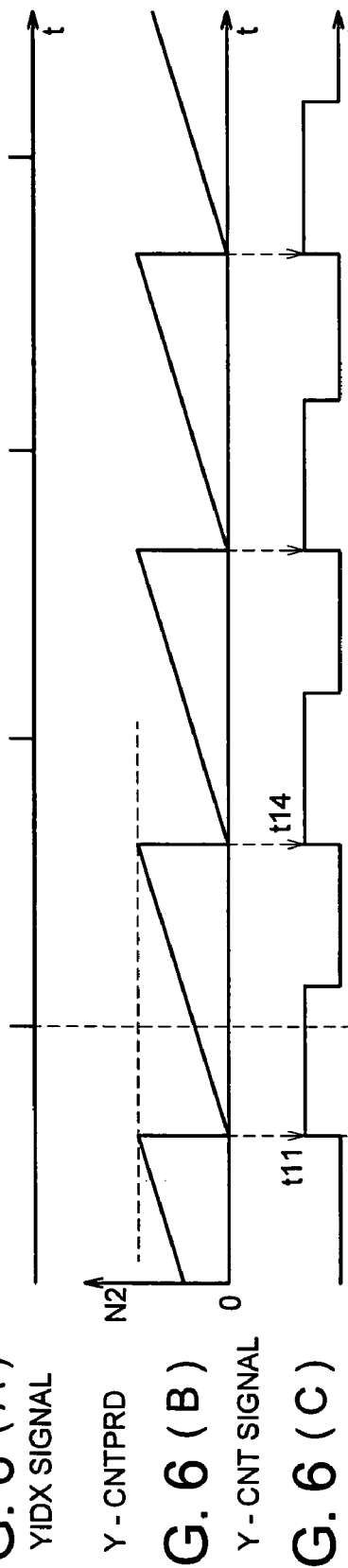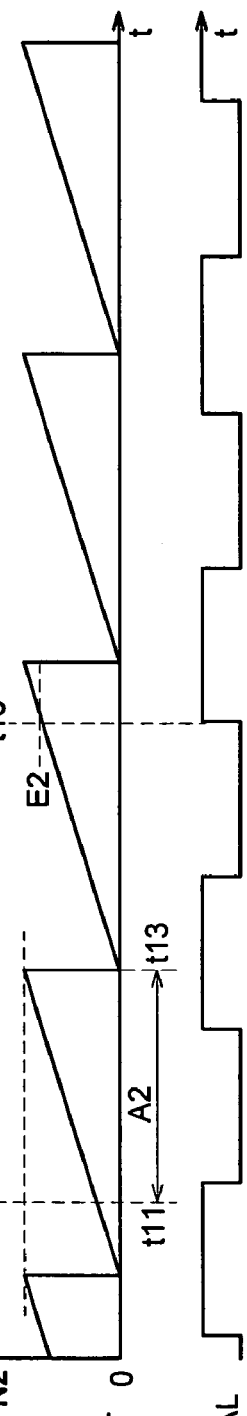

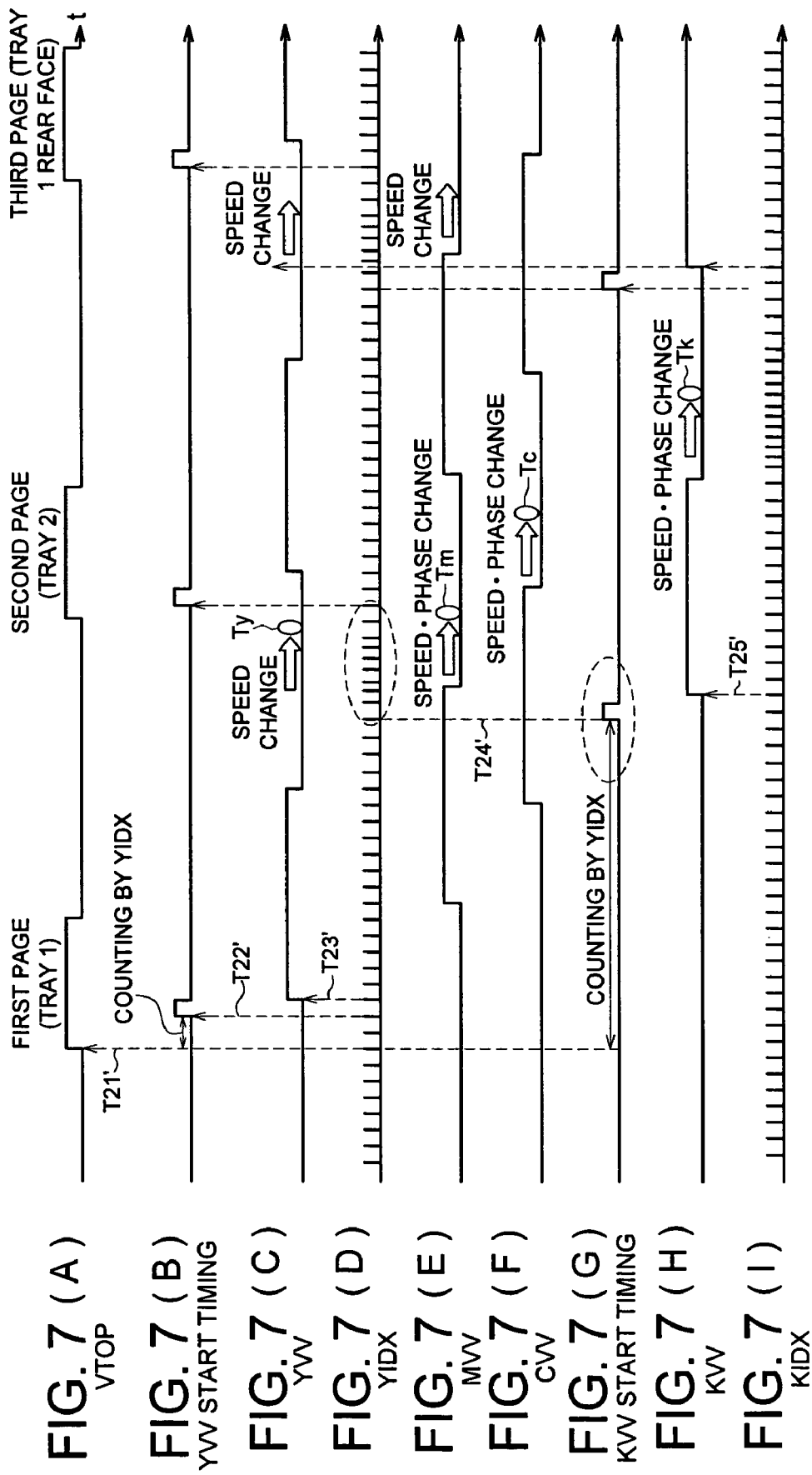

FIG. 8  CONFIGURATION EXAMPLE OF CONTROL SYSTEM IN COLOR COPIER 200
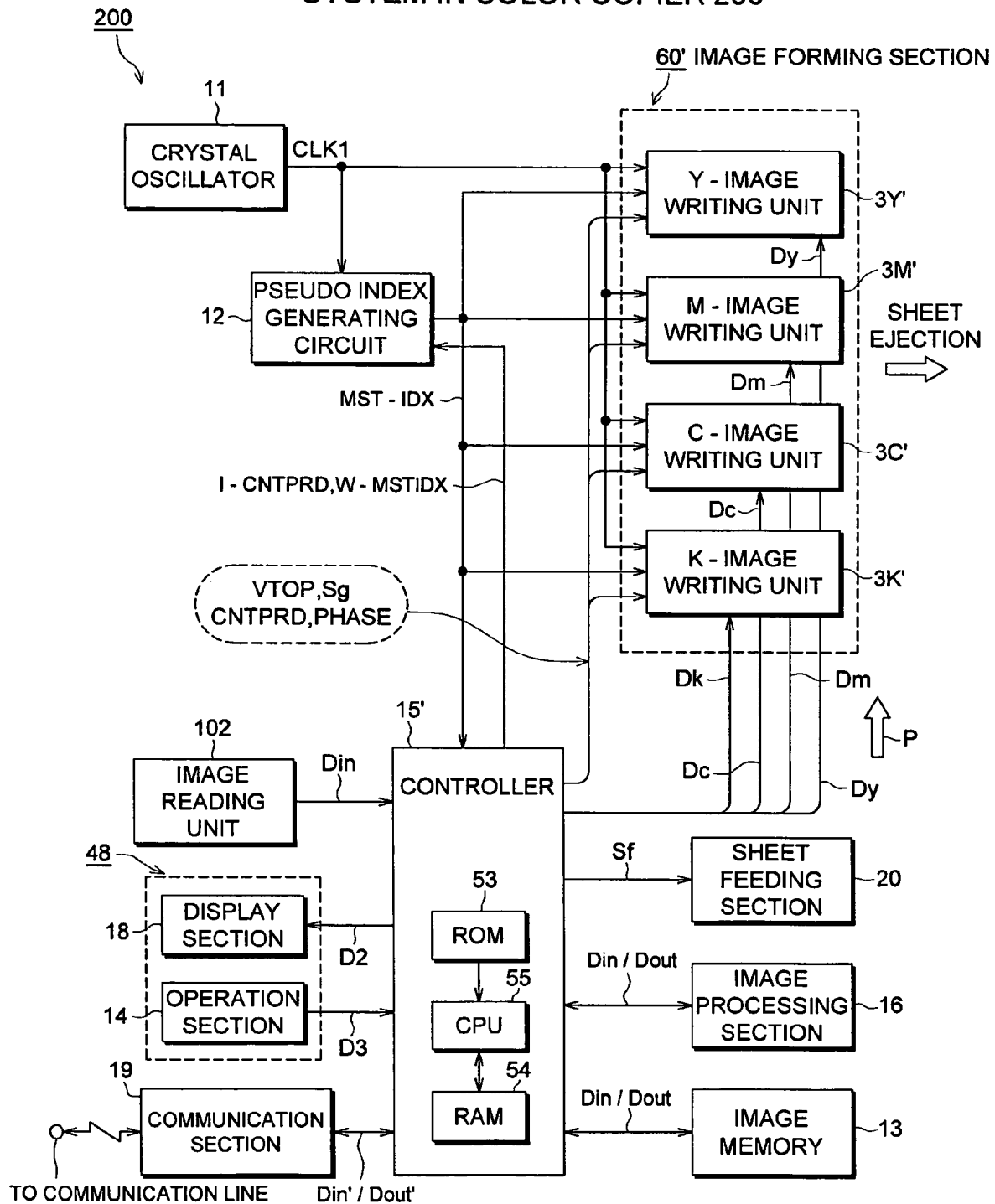

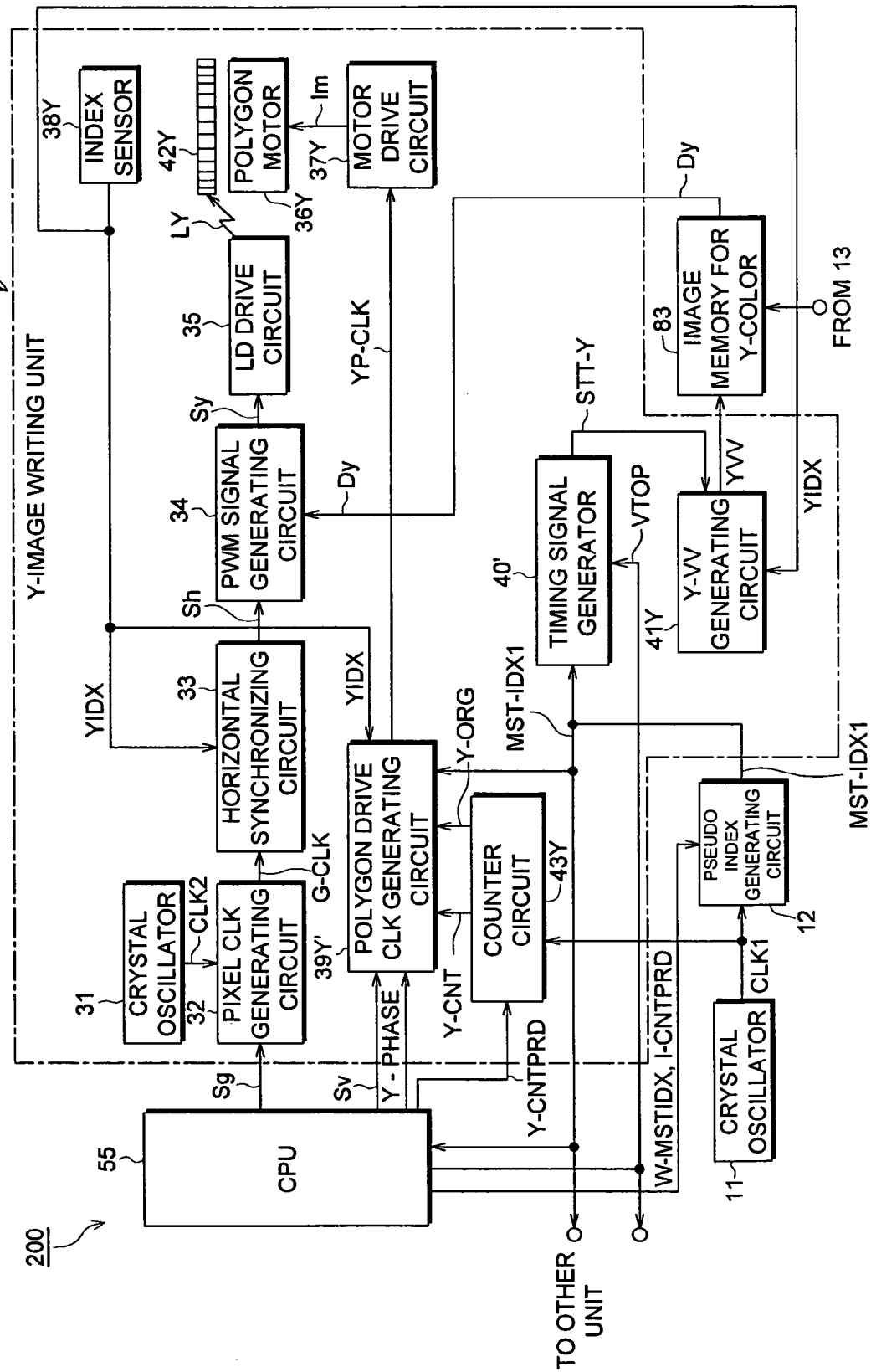
FIG. 9 CONFIGURATION EXAMPLE OF IMAGE WRITING UNIT 3Y' FOR Y-COLOR AND ITS PERIPHERAL CIRCUIT CONFIGURATION EXAMPLE OF POLYGON MIRROR DRIVE SYSTEM INCLUDING PSEUDO IDX GENERATING CIRCUIT

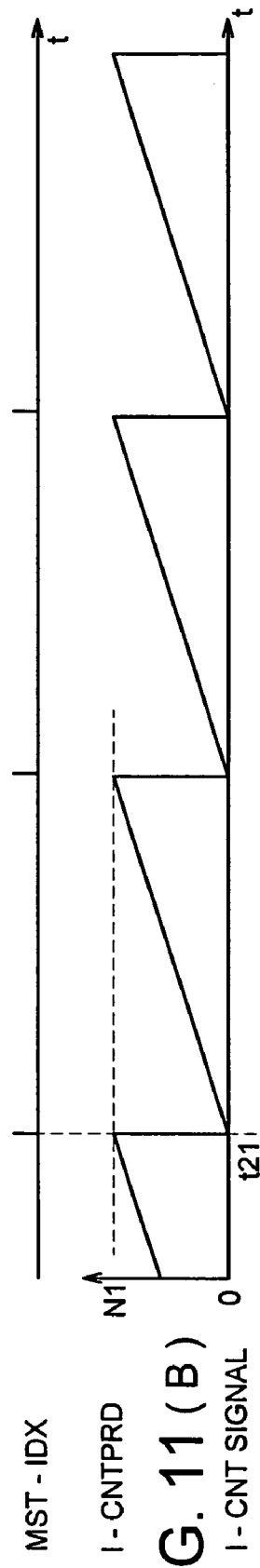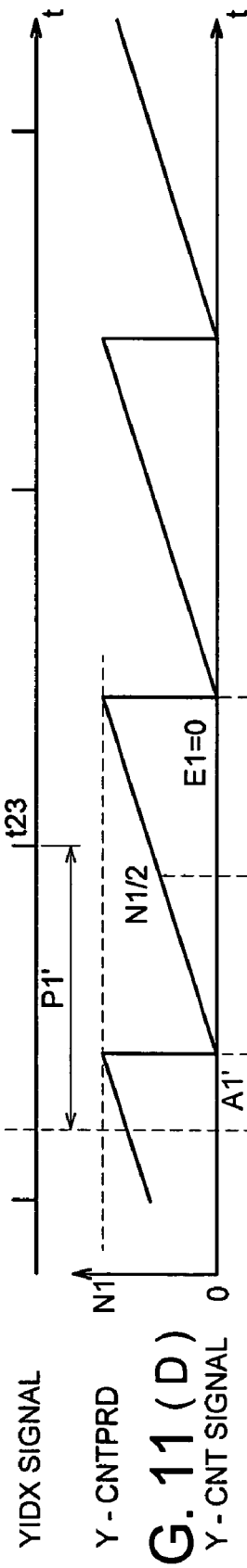
OPERATION EXAMPLE BEFORE MAGNIFICATION CORRECTION CONTROL (MST-IDX BASIS)
FIG. 11 (A) MST-IDX
FIG. 11 (B) I-CNTPRD / I-CNT SIGNAL
FIG. 11 (C) YIDX SIGNAL
FIG. 11 (D) Y-CNTPRD / Y-CNT SIGNAL
FIG. 11 (E) YP-CLK SIGNAL

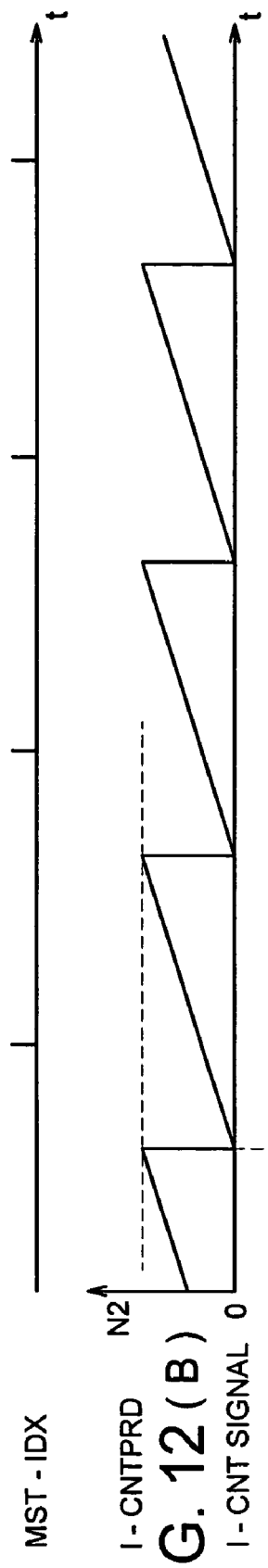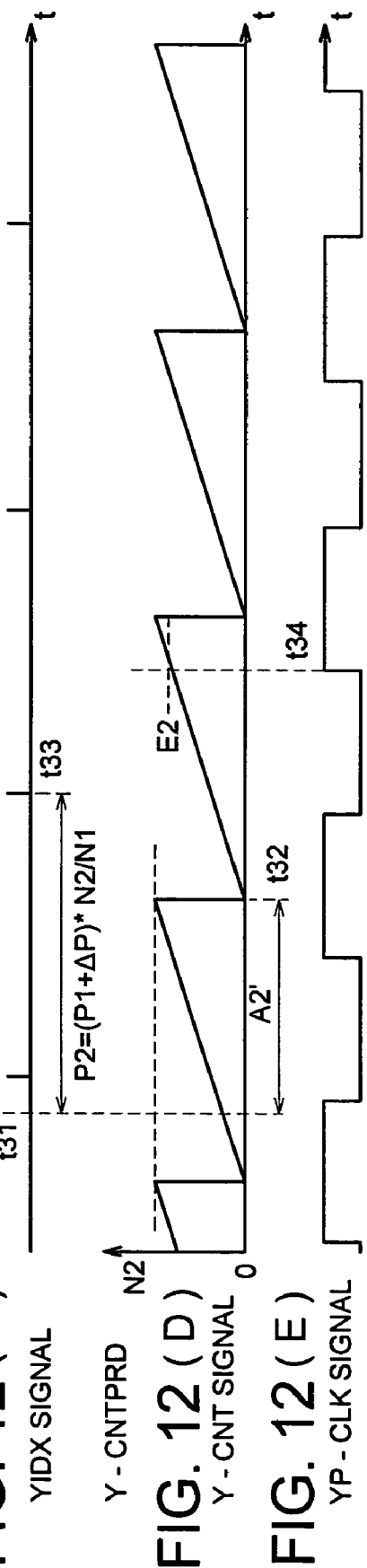

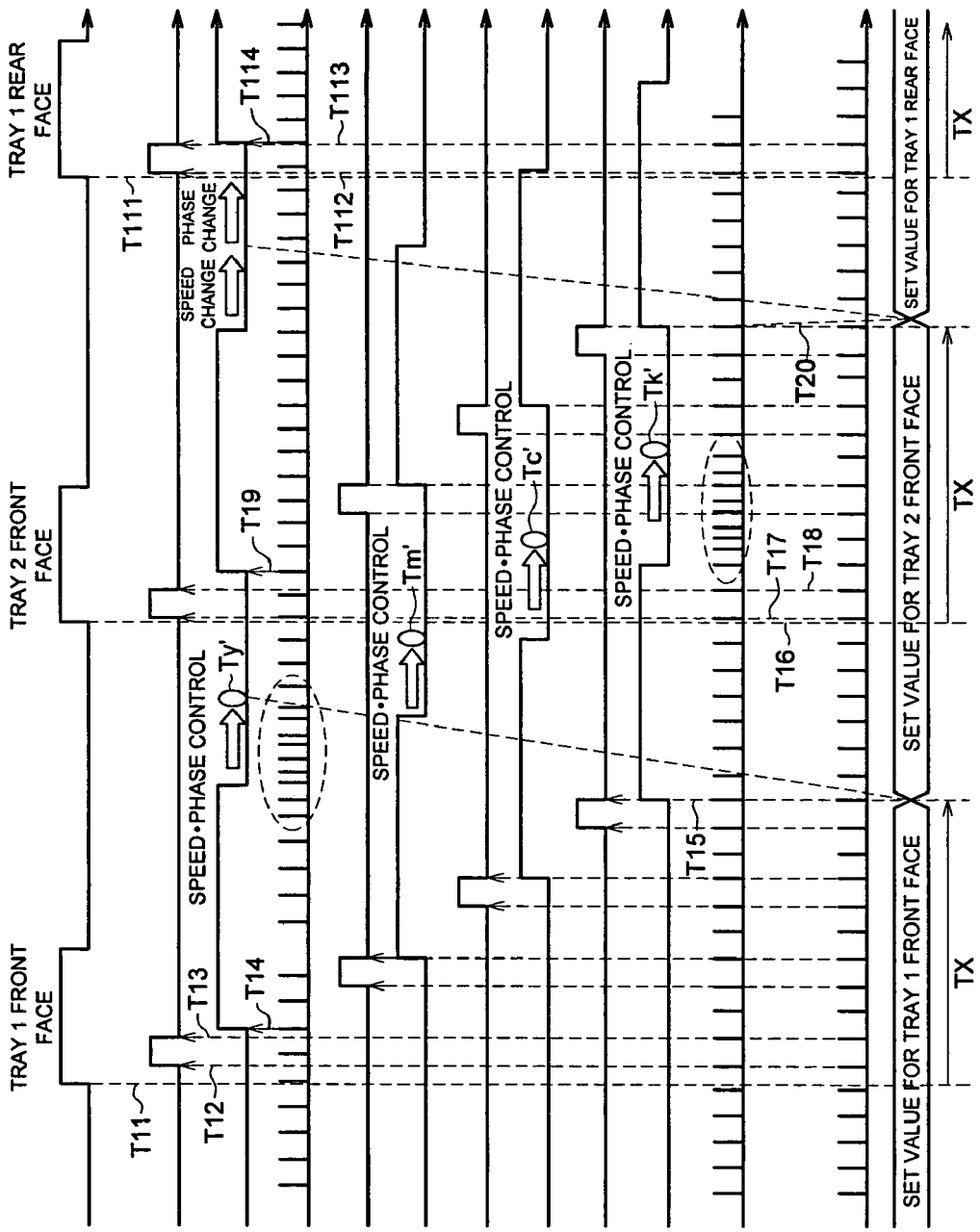

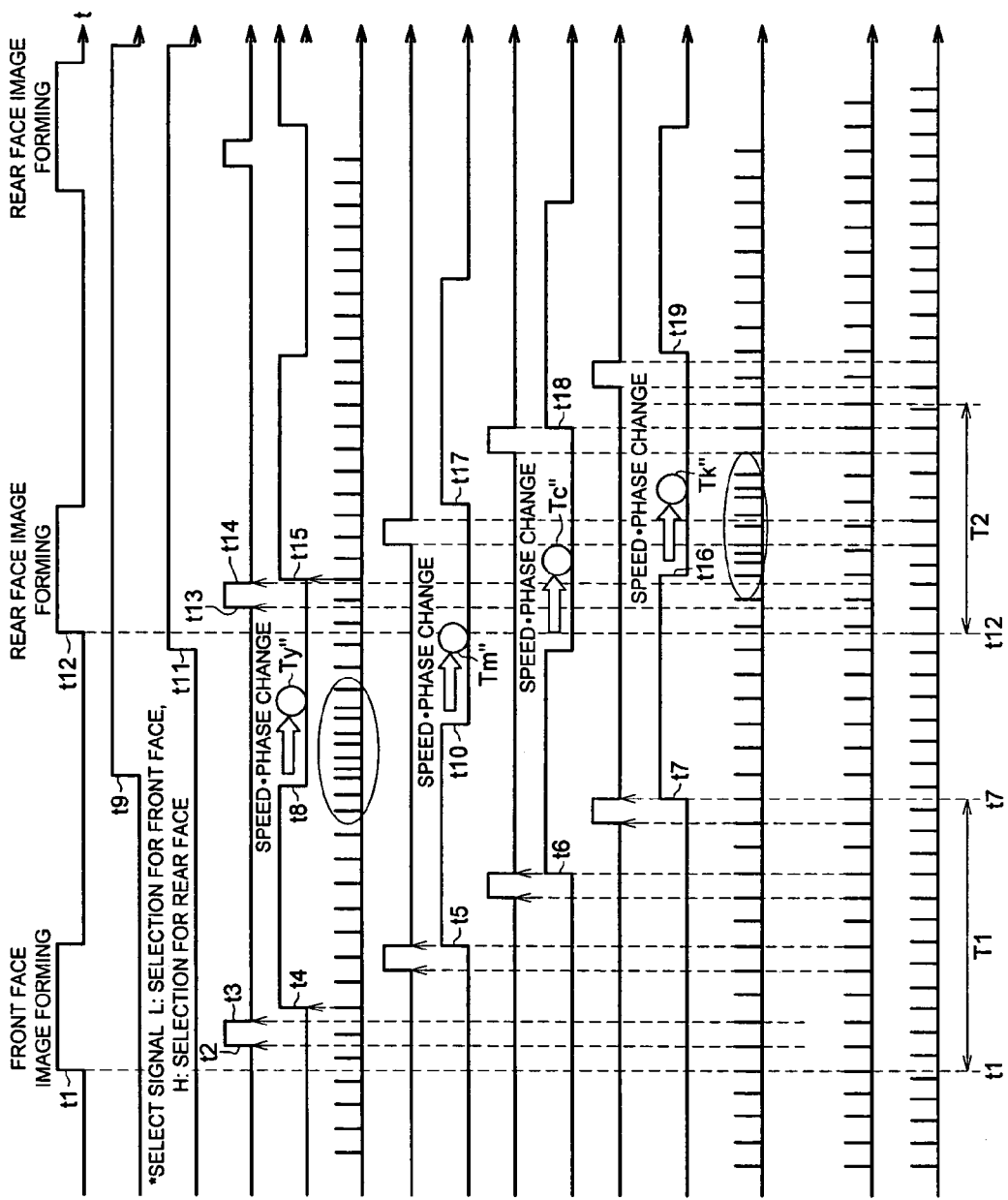

EXAMPLE OF PAPER SIZE SHRINKAGE IN
DOUBLE FACE IMAGE FORMATION

FIG. 17

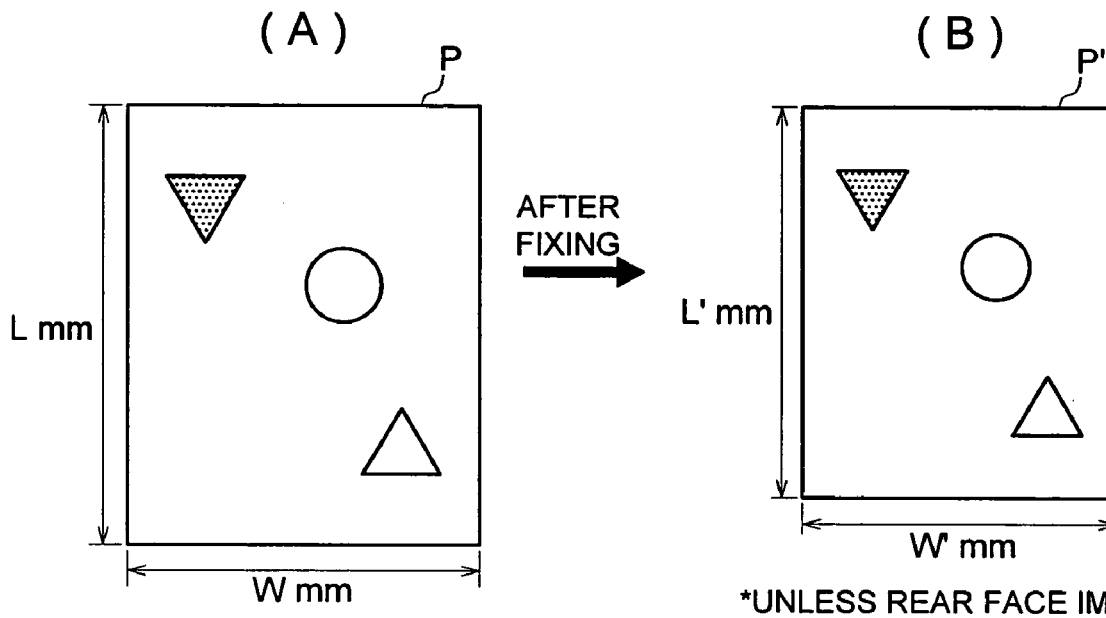

*UNLESS REAR FACE IMAGE IS FORMED TO COINCIDE WITH THIS SIZE, FRONT/REAR FACE REGISTRATION ERROR IS CAUSED

POLYGON DRIVE CLK FREQUENCY $\quad F = \dfrac{L}{L'} \cdot F0$

PIXEL CLK FREQUENCY $\quad F = \dfrac{L'}{L} \cdot \dfrac{W}{W'} \cdot f0$

F0: POLYGON DRIVE CLK FREQUENCY FOR FRONT FACE IMAGE FORMATION
F: POLYGON DRIVE CLK FREQUENCY FOR REAR FACE IMAGE FORMATION
f0: PIXEL CLK FREQUENCY FOR FRONT FACE IMAGE FORMATION
f: PIXEL CLK FREQUENCY FOR REAR FACE IMAGE FORMATION

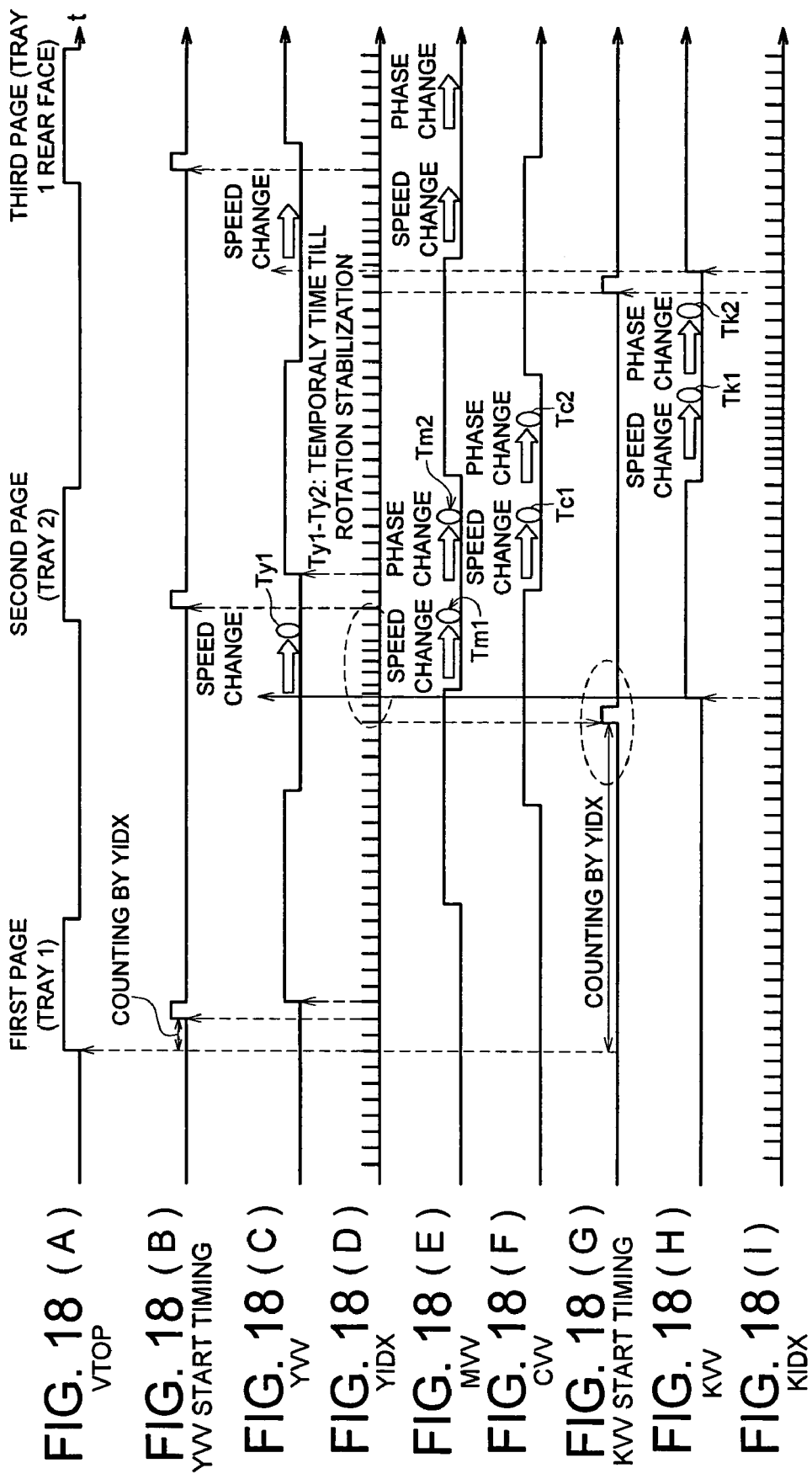

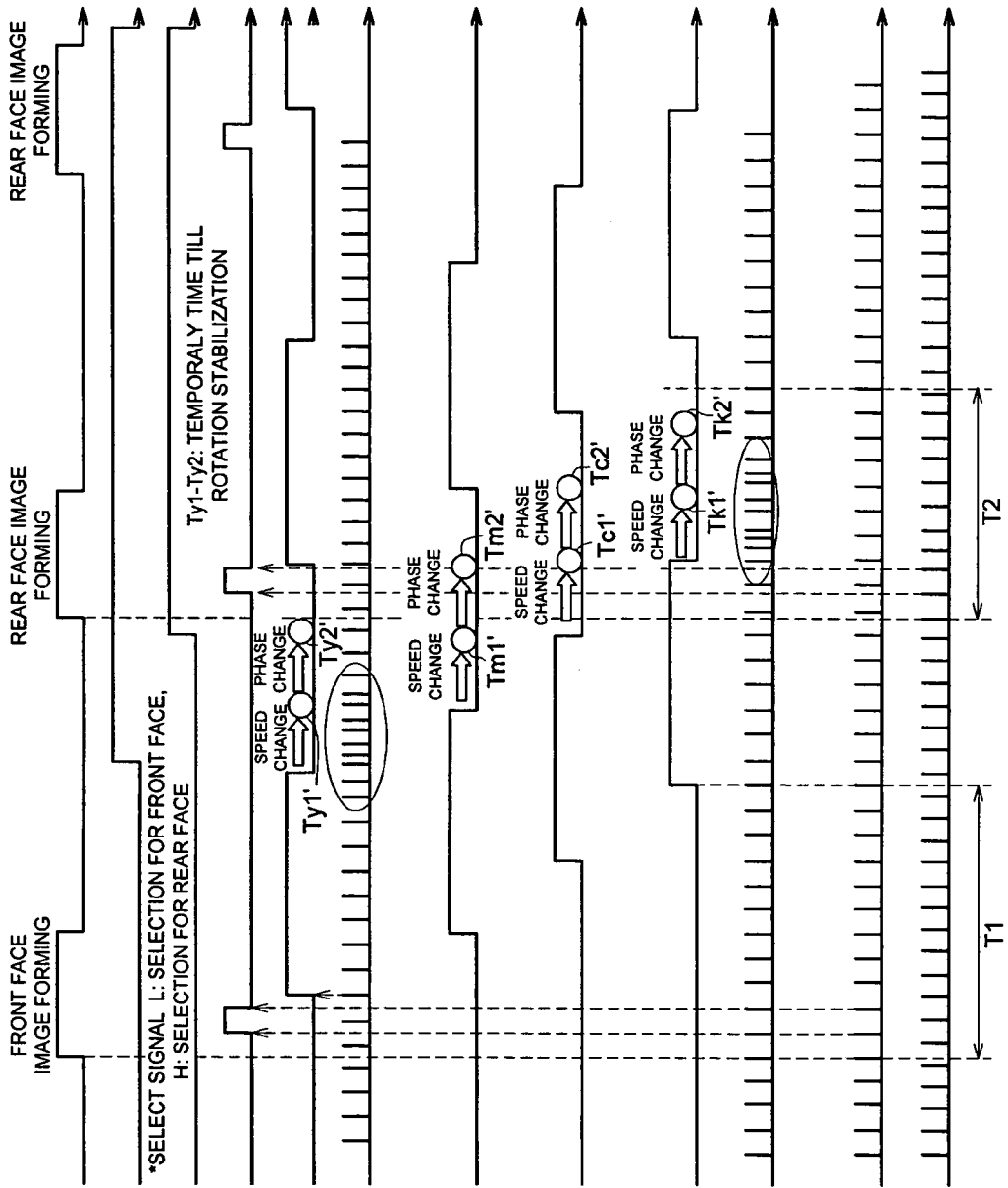

COLLOR IMAGE FORMING APPARATUS HAVING MAGNIFICATION CORRECTION FUNCTION

CROSS REFERENCE TO RELATED APPLICATION

The present application is based on Japanese Patent Application No. 2005-274553 filed with Japan Patent Office on Sep. 21, 2005, the entire content of which is hereby incorporated by reference.

BACKGROUND OF THE INVENTION

1. Technical Field

The present invention relates to an image forming apparatus that is preferably applied to a black-and white or color digital multifunctional machine equipped with copying functions, facsimile functions and printer functions and to a copier.

2. Description of Related Art

In recent years, there has come to be put to practical use a digital color copier that conducts color image forming based on color image data relating to red (R) color, green (G) color and blue (B) color acquired from colored document images. In the copier of this kind, image information of the document is read by a scanner, and color image data relating to image information of the document are acquired.

Further, a laser recording apparatus is mounted on the copier, and a laser beam emitted from a semiconductor laser light source is used for exposure scanning on a photoreceptor drum having thereon prescribed voltage to record images, depending on YMCK image data which are obtained by color-converting RGB image data acquired from a scanner into image data of yellow (Y) color, magenta (M) color, cyan (C) color and black (K) color. Images recorded on the photoreceptor drum are developed by each toner of each color, then, colors are superposed on an intermediate transfer body, for example, and each image is transferred onto a prescribed sheet from the intermediate transfer body, to be fixed. As a result, a color document image can be copied.

In a field of the color image forming apparatus of this kind, an apparatus wherein a color image can be formed on each of both sides of the sheet has been developed and is manufactured. Double-face forming functions are used for forming an image for a front cover on a sheet and for forming an image for a back cover on a sheet, when creating a booklet, for example. In many cases, a sheet that is thicker than a sheet mentioned in the text is used as a sheet for each of the front cover and back cover.

Sheets for the front cover and the back cover after double-face image forming are supposed to be subjected to post-processing such as center-folding and staple processing. In the double-face image forming processing of this kind, it is known that, after an image is formed on one side of a sheet, the sheet shrinks. The reason for this phenomenon is that a sheet onto which a color toner image has been transferred is subjected to thermal shrinkage by fixing processing, and the thicker the sheet is, the more remarkable the shrinkage is.

Each of FIGS. 17(A) and 17(B) is a diagram illustrating an example of shrinkage of sheet size in the case of double-face image forming. Sheet P shown in FIG. 17 (A) is in the state before fixing after being subjected to secondary transfer of color toner images. In sheet sizes for sheet P, a longitudinal length is L mm, and a lateral width is W mm. Sheet P' shown in FIG. 17(B) is in the state after fixing of sheet P. In sheet sizes for sheet P', a longitudinal length is constricted to L' mm, and a lateral width is constricted to W' mm. The reason for shrinkage of sheet sizes is considered to be moisture dessipation in the course of fixing. An image needs to be formed on the rear face of the sheet, taking such shrinkage of sheet sizes of sheet P into consideration. Incidentally, if image forming conditions are not adjusted to sheet sizes L' mm×W' mm after shrinkage, an image forming position (size) for the front face is deviated from that for the rear face.

A driving clock (hereinafter referred to as CLK) frequency of a polygon motor is changed, taking such shrinkage of sheet sizes of sheet P into consideration. When F0 represents polygon driving CLK frequency before shrinkage, namely, in the course of image forming on the front face, and F represents polygon driving CLK frequency after shrinkage, namely, in the course of image forming on the rear face, establishment is made so that $F=F0\times L/L'$ may hold.

Further, pixel CLK frequency that controls a laser beam is changed. When f0 represents pixel CLK frequency before shrinkage and f represents pixel CLK frequency after shrinkage, establishment is made so that $f=(L/L')\times(W/W')\times f0$ may hold. By changing a polygon driving CLK frequency and a pixel CLK frequency, in consideration of shrinkage in sheet sizes for sheet P as stated above, it is possible to obtain images which are well-registered between the front face and the rear face.

Further, when the polygon driving CLK frequency is changed from F0 to F under the assumption that V0 represents a process linear speed before shrinkage, G0 represents a gap between processes before shrinkage, process gap G represents a distance between units and V represents a process linear speed, apparent process linear speed V is changed as shown below.

(1) Apparent process linear speed $V=V0\times F0/F=v0\times L'/L$
(2) Gap between processes G (pixel)$=G0\times V0/V=G0\times L/L'$ In this case, the process linear speed V corresponds to a rotation speed of a photoreceptor representing an image carrier on which an image is formed.

Therefore, correction for an amount of front-face/rear-face magnification change (which is also called front-face/rear-face magnification correction or image size correction, after this) is needed even for a correction amount for color registration error which corresponds to gap between processes G. Accordingly, a polygon mirror which requires plane phase adjustment is subjected to practice of plane phase control when switching between front face and rear face. Control of the rotation speed of the polygon mirror and control of plane phase of a polygon mirror for each color of Y, M and C are practiced not only for double-face image forming processing but also for switching of trays.

For practicing image size correction in the case of switching between the front face and the rear face of a sheet or between trays, there is employed a method to control a rotation speed and a phase of a polygon mirror. Each of FIGS. 18(A)-18(I) is a time chart showing an example of image forming operations (for Y color) in the case of switching trays in an image writing unit for each of Y, M, C and K, relating to the conventional example.

A VTOP signal shown in FIG. 18(A) is a signal that rises in synchronization with an index signal (hereinafter referred to as KIDX signal) for forming K color images shown in FIG. 18(I), after a leading edge of the sheet fed out of tray 1 is detected by an unillustrated leading edge detection sensor. YVV start timing shown in FIG. 18(B) is for a signal that rises in synchronization with KIDX signal, where an unillustrated KIDX counter is started, and the number of pulses for KIDX signal is counted.

A YVV signal shown in FIG. 18(C) is a signal that rises in synchronization with an index signal (hereinafter referred to as YIDX signal) for forming Y color images shown in FIG. 18(D). During the period of "H" level of the YVV signal, an image in Y color is formed on a sheet coming from tray 1, and after completion of the foregoing, there is made control for changing a rotation speed of a polygon mirror for forming an image in Y color. In this case, a frequency of the YIDX signal is fluctuated-until the rotation speed of the polygon mirror is stabilized. With regard to the sheet for second page fed out of tray 2, image forming for Y color is started after waiting for stabilizing time Ty1 during which a rotation of the polygon mirror is stabilized.

In the same way, during the period of "H" level of the MVV signal shown in FIG. 18(E), an image in M color is formed on a sheet coming from tray 1, and after completion of the foregoing, there is made control for changing a rotation speed of a polygon mirror for forming-an image in M color. In this case, a frequency of the MIDX signal is fluctuated until the rotation speed of the polygon mirror for M color is stabilized. Phase change is controlled after waiting for stabilizing time Tm1 during which a rotation of the polygon mirror is stabilized. With regard to the sheet for second page fed out of tray 2, image forming for M color is started after waiting for stabilizing time Tm2 during which a rotation of the polygon mirror for M color is stabilized.

Further, during the period of "H" level of the CVV signal shown in FIG. 18(F), an image in C color is formed on a sheet coming from tray 1, and after completion of the foregoing, there is made control for changing a rotation speed of a polygon mirror for forming an image in C color. In this case, a frequency of the CIDX signal is fluctuated until the rotation speed of the polygon mirror for C color is stabilized. Phase change is controlled after waiting for stabilizing time Tc1 during which a rotation of the polygon mirror is stabilized. With regard to the sheet for second page fed out of tray 2, image forming for C color is started after waiting for stabilizing time Tc2 during which a rotation of the polygon mirror for C color is stabilized.

Further, KTV start timing shown in FIG. 18(G) is for a signal that rises in synchronization with KIDX signal, where an unillustrated KIDX counter is started, and the number of pulses for KIDX signal is counted KVV signal shown in FIG. 18(H) is a signal that rises in synchronization with KIDX signal shown in FIG. 18(I). During the period of "H" level of the KVV signal, an image in K color is formed on a sheet coming from tray 1, and after completion of the foregoing, there is made control for changing a rotation speed of a polygon mirror for forming an image in K color.

In this case, a frequency of the KIDX signal is fluctuated until the rotation speed of the polygon mirror for K color is stabilized. Phase change is controlled after waiting for stabilizing time Tk1 during which a rotation of the polygon mirror is stabilized. With regard to the sheet for second page fed out of tray 2, image forming for K color is started after waiting for stabilizing time Tk2 during which a rotation of the polygon mirror for K color is stabilized. In the example of image forming operations in the case of switching trays mentioned above, controls of rotation speed of polygon mirror for forming an image in each of Y, M and C colors and of a phase are practiced after the control of rotation speed of a polygon mirror for forming an image in K color has been completed, because it is carried out based on KIDX signals.

In association with the aforesaid control of a polygon mirror, a laser beam scanning apparatus is disclosed in Patent Document 1. In this laser beam scanning apparatus, there is provided a rotation phase calculating section that calculates a time difference between an optical beam detection signal corresponding to a reference polygon mirror and an optical beam detection signal [corresponding to a polygon mirror other than the reference polygon mirror, and compares phase control data based on the time difference with phase control data corresponding to a reference polygon mirror, to generate a rotation frequency. By providing such rotation phase calculating section, an orientation of the mirror surface of the polygon mirror can be controlled simply.

Patent Document 1: Unexamined Japanese Patent Application Publication NO. 9-230273 (FIG. 1 on page 5)

Incidentally, in the image forming apparatus applied by the inventors of the present invention, there is employed a method to correct magnifications for the front face and the rear face by changing rotation speed and phase of the polygon mirror by the use of pseudo index signals.

Each of FIGS. 19 (A)-18(O) is a time chart showing an example of operations (for Y color) in the case of correcting magnifications for the front face and the rear face of a color image forming apparatus.

A VTOP signal shown in FIG. 19(A) is a signal that rises in synchronization with YIDX signal shown in FIG. 19(F) after a leading edge of the sheet fed out of tray 1 is detected. YVV start timing shown in FIG. 19(D) is for a signal that rises in synchronization with YIDX signal, where an unillustrated YIDX counter is started, and the number of pulses for YIDX signal is counted. A YVV signal shown in FIG. 19(E) is a signal that rises in synchronization with YIDX signal shown in FIG. 19(F). During the period of "H" level of the YVV signal, an image in Y color is formed on a sheet coming from tray 1.

The control for changing a rotation speed of the polygon mirror for forming an image in Y color is carried out after completion of Y color image forming on the front face of the sheet, namely, after KVV signal shown in FIG. 19(H) has risen. In this case, a frequency of the YIDX signal is fluctuated until the rotation speed of the polygon mirror for Y color is stabilized. Phase change is controlled after waiting for stabilizing time Ty1' during which a rotation of the polygon mirror is stabilized. With regard to the rear face of the sheet, image forming for Y color is started after waiting for stabilizing time Ty2' during which a rotation of the polygon mirror for Y color is stabilized.

During the period of "H" level of the MVV signal shown in FIG. 19(H), an image in M color is formed on the front face of the sheet, and after completion of the foregoing, there is practiced a control for changing a rotation speed of a polygon mirror for forming an image in M color. In this case, a frequency of the MIDX signal is fluctuated until the rotation speed of the polygon mirror for M color is stabilized. Phase change is controlled after waiting for stabilizing time Tm1' during which a rotation of the polygon mirror is stabilized. With regard to the rear face of the sheet, image forming for M color is started after waiting for stabilizing time Tm2' during which a rotation of the polygon mirror for M color is stabilized.

During the period of "H" level of the CVV signal shown in FIG. 19(J), an image in C color is formed on the front face of the sheet, and after completion of the foregoing, there is practiced a control for changing a rotation speed of a polygon mirror for forming an image in C color. In this case, a frequency of the CIDX signal is fluctuated until the rotation speed of the polygon mirror for C color is stabilized. Phase change is controlled after waiting for stabilizing time Tc1' during which a rotation of the polygon mirror is stabilized. With regard to the rear face of the sheet, image forming for C color is started after waiting for stabilizing time Tc2' during which a rotation of the polygon mirror for C color is stabilized.

KVV start timing shown in FIG. 19(L) is for a signal that rises in synchronization with YIDX signal, where an unillustrated KIDX counter is started, and the number of pulses for YIDX signal is counted. KVV signal shown in FIG. 19(L) is a signal that rises in synchronization with KIDX signal shown in FIG. 19(M). During the period of "H" level of the KVV signal, an image in K color is formed on a sheet coming from tray 1, and after completion of the foregoing, there is made control for changing a rotation speed of a polygon mirror for forming an image in K color.

In this case, a frequency of the KIDX signal is fluctuated until the rotation speed of the polygon mirror for K color is stabilized. Phase change is controlled after waiting for stabilizing time Tk1' during which a rotation of the polygon mirror is stabilized. With regard to the rear face of th sheet, image forming for K color is started after waiting for stabilizing time Tk2' during which a rotation of the polygon mirror for K color is stabilized. Incidentally, T1 shown in FIG. 19(O) shows a period during which the start timing for each of YVV signal, MVV signal and CVV signal in the case of image forming on the front face is determined with MST-IDX1 serving as a count source, while T2 shows a period during which the start timing for each of YVV signal, MVV signal and CVV signal in the case of image forming on the rear face is determined with MST-IDX2 serving as a count source. By using pseudo index signals for correction of magnifications on the front face and the rear face as stated above, productivity is improved.

However, a color image forming apparatus relating to the conventional example has following problems.

(i) Phase changing control cannot be started until the moment when the polygon mirror arrives at its stable rotation by the instruction for changing rotation speed of the polygon mirror. Further, even after practicing the phase changing control, image forming processing cannot be started until the polygon mirror comes to its stable rotation. Therefore, when the magnification is corrected, the switching operation takes time, and productivity for double-face operations is lowered by conducting correction operation for magnifications.

In the example of image size correction in the case of tray switching shown in FIGS. 18(A)-18(I), it is not possible to start succeeding image formation processing for each color, without waiting for stabilizing time Ty1 for stabilizing polygon mirror rotation for Y-color, after Y-color image formation processing, without waiting for stabilizing time Tm1+Tm2 for stabilizing polygon mirror rotation for M-color, after M-color image formation processing, without waiting for stabilizing time Tc1+Tc2 for stabilizing polygon mirror rotation for C-color, after C-color image formation processing and without waiting for stabilizing time Tk1+Tk2 for stabilizing polygon mirror rotation for K-color, after K-color image formation processing. Therefore, high speed image formation processing is hampered by waiting for these stabilizing times Ty1, Tm1+Tm, Tc1+Tc2 and Tk1+Tk2.

(ii) The aforesaid problems are caused equally even in the case of switching image formation processing between the front face and rear face by using pseudo index signals shown in FIGS. 19(A)-19(O). In this case, it is not possible to start succeeding image formation processing for each color, without waiting for stabilizing time Ty1'+Ty2' for stabilizing polygon mirror rotation for Y-color, after Y-color image formation processing, without waiting for stabilizing time Tm1'+Tm2' for stabilizing polygon mirror rotation for M-color, after M-color image formation processing, without waiting for stabilizing time Tc1'+Tc2' for stabilizing polygon mirror rotation for C-color, after C-color image formation processing and without waiting for stabilizing time Tk1'+Tk2' for stabilizing polygon mirror rotation for K-color, after K-color image formation processing. Therefore, high speed image formation processing is hampered by waiting for these stabilizing times Ty1'+Ty2', Tm1'+Tm2', Tc1'+Tc2' and Tk1'+Tk2'.

(iii) In the laser beam apparatus seen in Patent Document 1, there is employed a method to generate polygon clock by comparing a counter cycle and a count value with a start-up point value calculated from a phase difference of detector pulse signals (index signals), concerning phase control of a polygon mirror. Even in this method, it is not possible to start color image forming processing for the succeeding page, without waiting stabilizing time after controlling a phase of a polygon mirror until its rotation is stabilized. Therefore, productivity in operations for image size correction is lowered, and continuous high speed processing for color images is prevented.

With the foregoing as a background, the invention has solved the aforesaid problems, and its objective is to provide an image forming apparatus wherein a decline of productivity in the course of correcting image size can be controlled, and continuous high speed processing for color images can be carried out.

SUMMARY

For solving the problems stated above, the first image forming apparatus reflecting a feature of the present invention is an image forming apparatus for forming color images comprising at least two or more colors, having a function of magnification correction of image size by one page unit, the image forming apparatus including:

an image carrier;

a polygonal mirror rotator independently provided for each color; and a controller which simultaneously conducts first control for changing rotation speed of the polygonal mirror rotator in order for changing image size in a sub-scanning direction perpendicular to a main scanning direction, and second control for correcting a correction amount for color registration error depending on magnification correction of image size, and for adjusting a rotating phase of the polygonal mirror rotator depending on the corrected correction amount for color registration error, where the main scanning direction is a direction in which the image carrier is scanned with an exposure beam coming from the polygonal mirror rotator.

In the first image forming apparatus, when forming images by correcting magnification in terms of image sizes by one page unit, the controller conducts simultaneously control for changing rotation speed of the polygonal mirror rotator for changing image size in the sub-scanning direction and control for correcting a correction amount for color registration error depending on correction of magnification for image sizes, and for adjusting a rotating phase of the polygonal mirror rotator depending on a correction amount for color registration error after the correction.

It is therefore possible to shorten a stabilizing time during which the rotation of the polygonal mirror rotator is stabilized, compared with an occasion wherein speed control and phase control of the polygonal mirror rotator are carried out in succession.

The second image forming apparatus reflecting another aspect of the present invention is an image forming apparatus for continuously forming color images comprising at least two or more colors, having a function of magnification correction of image size by one page unit, the image forming apparatus including:

a polygonal mirror rotator which is provided independently for each color image forming unit;

an image carrier on which a latent image is formed by an exposure beam scanned by the polygonal mirror rotator and the latent image is developed to be a color image; and a controller comprising:

a color registration error detecting section which detects color registration error on each color image formed on the image carrier;

a color registration error correcting section which corrects the color registration error depending on an amount of the color registration error obtained from the color registration error detecting section; and a calculating section which calculates a rising edge and a falling edge of a drive clock signal controlling a rotation speed of the polygonal mirror rotator for a succeeding page, based on an amount of phase control calculated by correcting an amount of color registration error correction after correction by the color registration error correcting section depending on an amount of magnification correction, on an output value of a counter provided and independently controlled for each color to determine a drive clock signal cycle that controls a rotation speed of the polygonal mirror rotator, on a phase difference between a first main scanning basis signal generated by detecting an exposure beam scanned by the polygonal rotator for a first color image forming unit immediately before conducting magnification correction for image sizes with a sensor arranged in a scanning optical path and the second main scanning basis signal generated by detecting an exposure beam scanned by the polygonal rotator for a second color image forming unit with a sensor arranged in a scanning optical path, and on a phase difference between a first base point of a count cycle of a counter for generating a drive clock signal of the polygonal mirror rotator for each of the first and second color image forming units immediately before conducting magnification correction for image size and a second base point of a count cycle after the magnification correction for image size, wherein the controller executes polygonal mirror rotator drive control in a case of magnification correction for image sizes by the drive clock signal, which controls a rotation speed of the polygonal mirror rotator, generated based on an output of the calculating section.

In the second image forming apparatus, when correcting an image size by one page unit, an image is formed on the image carrier by an exposure beam oscillated by the polygonal mirror rotator, and the image is developed to be a color image. The color registration error detection section detects color registration errors of each color image formed on the image carrier. The color registration error correction section corrects color registration errors depending on an amount of detection of color registration errors obtained from the color registration error detection section. On the assumption of the foregoing, the calculating section calculates a rising edge and a falling edge of drive clock signals controlling a rotation speed of the polygonal mirror rotator for the succeeding page based on an amount of phase control calculated by correcting an amount of correction of color registration errors depending on an amount of magnification adjustment, an output value of a counter that is provided independently of each color for determining a cycle of drive clock signal and is controlled independently, a phase difference between the first main scanning basis signal immediately before conducting magnification correction for image sizes and the second main scanning basis signal, and on a phase difference between a base point of a count cycle of the counter for generating drive clock signal of the polygonal mirror rotator and a base point of a count cycle under the condition of count cycle after correction of magnification for image size, in the controller.

For example, when images are formed in the order of the first, second, third and fourth color image forming units wherein the earliest one comes first, the controller controls rotational phase for each polygonal mirror rotator so that the second color image forming unit may use a base point of a count cycle of a counter for generating drive clock signals of the polygonal mirror rotator of the first color image forming unit as a base, the third color image forming unit may use a base point of a count cycle of a counter for generating drive clock signals of the polygonal mirror rotator of the second color image forming unit as a base, and the fourth color image forming unit may use a base point of a count cycle of a counter for generating drive clock signals of the polygonal mirror rotator of the third color image forming unit as a base.

Therefore, compared with a conventional method, it is possible to shorten stabilizing time during which a rotation of the polygonal mirror rotator is stabilized, because speed control and phase control of the polygonal mirror rotator can be carried out simultaneously.

The third image forming apparatus reflecting another aspect of the present invention is a tandem type color image forming apparatus having a function to correct image sizes by one page unit and being capable of forming color images composed of at least two or more colors continuously, the image forming apparatus including:

a polygonal mirror rotator which is provided independently for each color image forming unit;

an image carrier on which a latent image is formed by an exposure beam scanned by the polygonal mirror rotator and the latent image is developed to be a color image; and a controller comprising:

a color registration error detecting section which detects color registration error on each color image formed on the image carrier;

a color registration error correcting section which corrects the color registration error depending on an amount of the color registration error obtained from the color registration error detecting section; and a calculating section which calculates a rising edge and a falling edge of a drive clock signal controlling a rotation speed of the polygonal mirror rotator for a succeeding page, based on an amount of phase control calculated by correcting an amount of color registration error correction after correction by the color registration error correcting section depending on an amount of magnification correction, on an output value of a counter provided and independently controlled for each color to determine a drive clock signal cycle that controls a rotation speed of the polygonal mirror rotator, on a phase difference between a first main scanning basis signal generated by detecting an exposure beam scanned by the polygonal rotator for a first color image forming unit immediately before conducting magnification correction for image sizes with a sensor arranged in a scanning optical path and the second main scanning basis signal generated by detecting an exposure beam scanned by the polygonal rotator for a second color image forming unit with a sensor arranged in a scanning optical path, and on a phase difference between a base point of a count cycle for generating a pseudo index signal, which is obtained by dividing a source oscillation signal of an original oscillator used in common with generation of drive clock signal of the polygonal mirror rotator in practicing rotational phase control of the polygonal mirror rotator so that the pseudo index signal agrees with one plane cycle of the polygonal mirror rotator, and a base point of a counter cycle for generating drive clock signal of the polygonal mirror rotator for each color unit, wherein the controller executes polygonal mirror rotator drive control in a case of magnification correction for image sizes by the drive clock signal, which controls a rotation speed of the polygonal mirror rotator, generated based on an output of the calculating section.

In the third image forming apparatus, when correcting an image size by one page unit, an image is formed on the image carrier by an exposure beam oscillated by the polygonal mirror rotator, and the image is developed to be a color image. The color registration error detection section detects color registration errors of each color image formed on the image carrier. The color registration error correction section corrects color registration errors depending on an amount of detection of color registration errors obtained from the color registration error detection section. On the assumption of the foregoing, the calculating section calculates a rising edge and a falling edge of drive clock signals controlling a rotation speed of the polygonal mirror rotator for the succeeding page based on an amount of phase control calculated by correcting an amount of correction of color registration errors depending on an amount of magnification adjustment, an output value of a counter that is provided independently of each color for determining a cycle of drive clock signal and is controlled independently, a phase difference between the first main scanning basis signal immediately before conducting magnification correction for image sizes and the second main scanning basis signal, and on a phase difference between a base point of a count cycle generating pseudo index signal and a base point of a counter cycle for generating drive clock signal for the polygonal mirror rotator of each color unit, in the controller.

Therefore, compared with a conventional method, it is possible to shorten stabilizing time during which a rotation of the polygonal mirror rotator is stabilized, because speed control and phase control of the polygonal mirror rotator can be carried out simultaneously.

BRIEF DESCRIPTION OF THE DRAWINGS

These and other objects, advantages and features of the invention will become apparent from the following description thereof taken in conjunction with the accompanying drawings in which.

Figure 10:
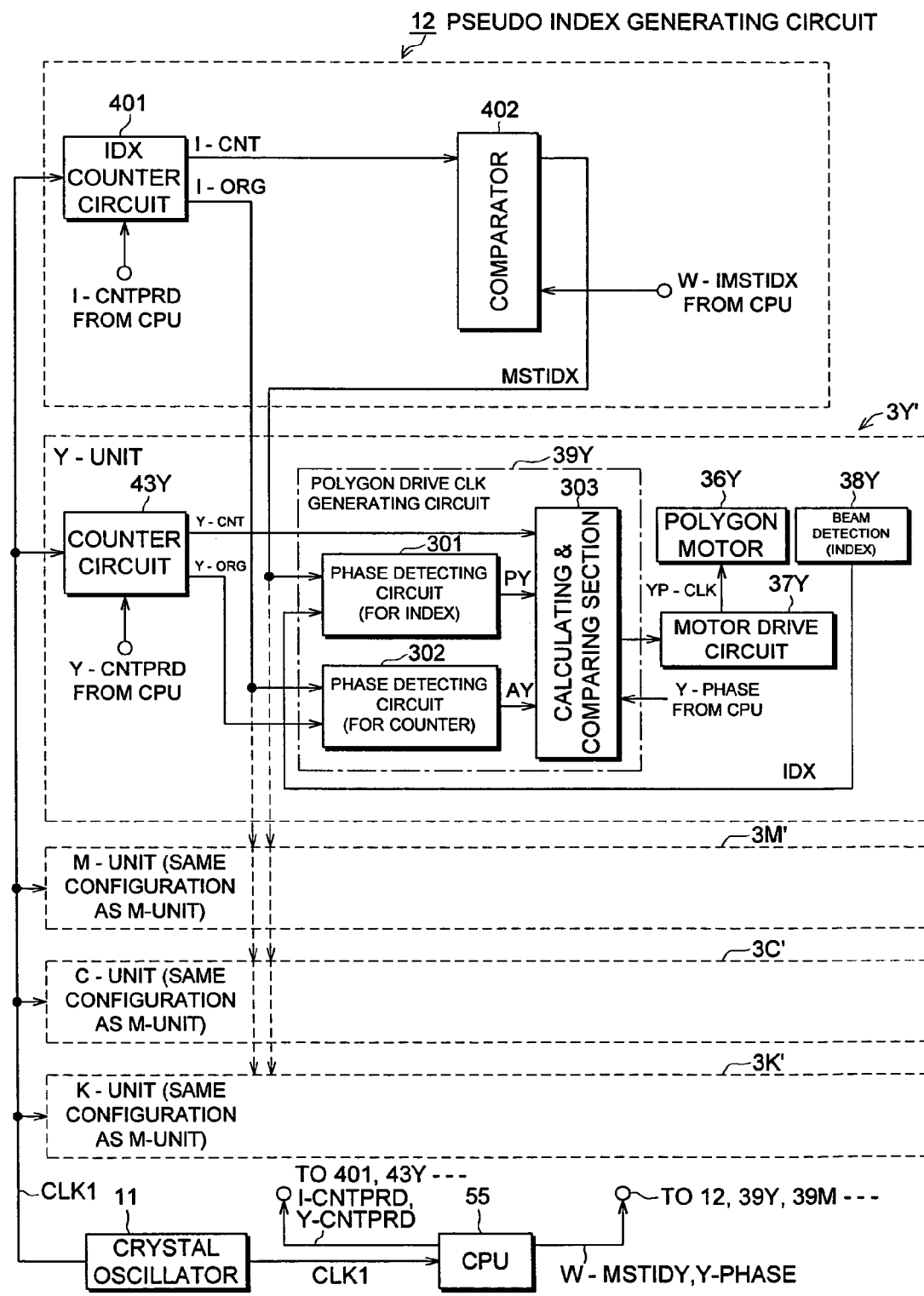
Figure 14:
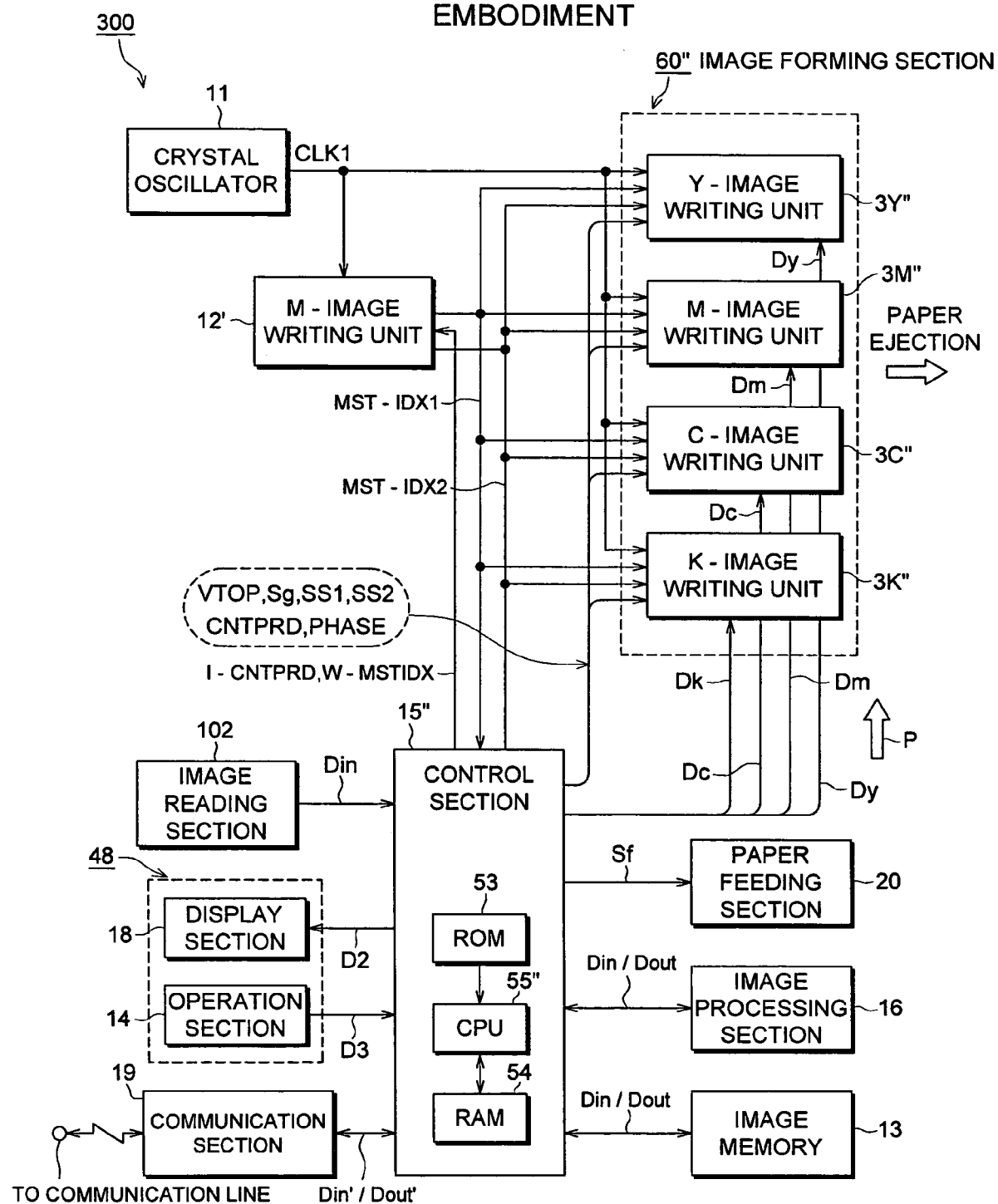
Figure 15:
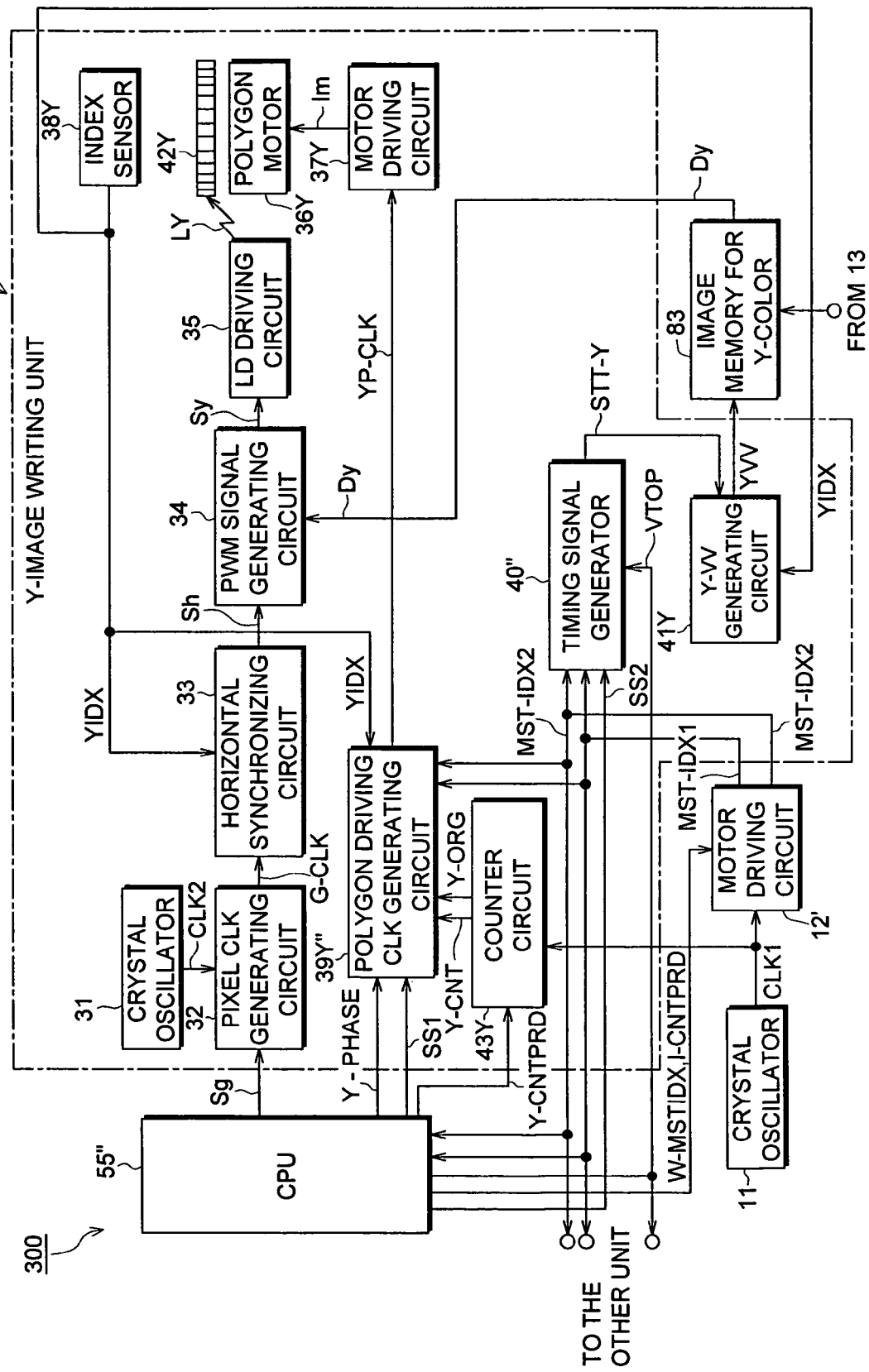

Each of FIGS. 5 (A)-5 (F) is a time chart showing an example of operations (YP-CLK basis time) before magnification correction control in image forming section 60;

Each of FIGS. 6 (A)-6 (F) is a time chart showing an example of operations (YP-CLK signal basis time) after magnification correction control in image forming section 60;

Each of FIGS. 7(A)-7(I) is a time chart showing an example of operations (Y-color basis) after magnification correction control of color copier 100;

FIG. 8 is a block diagram showing an example of configuration of color copier 200 as the second embodiment;

FIG. 9 is a block diagram showing an example of configuration of image writing unit 3Y' for Y-color image forming shown in FIG. 8 and its peripheral circuit;

FIG. 10 is a block diagram showing an example of configuration of a polygon mirror drive system including a pseudo IDX generating circuit;

Each of FIGS. 11(A)-11(E) is a time chart showing an example of operations (MST-IDEX basis time) before magnification correction control in image forming section 60';

Each of FIGS. 12(A)-12(E) is a time chart showing an example of operations (MST-IDEX basis time) after magnification correction control in image forming section 60';

Each of FIGS. 13(A)-13(M) is a time chart showing an example of operations (MST-IDEX signal basis) after magnification correction control of color copier 200;

FIG. 14 is a block diagram showing an example of configuration of a control system in color copier 300 relating to the third embodiment;

FIG. 15 is a block diagram showing an example of configuration of image writing unit 3Y'' for Y-color image forming extracted from FIG. 14 and its peripheral circuit;

Each of FIGS. 16(A)-16(O) is a time chart showing an example of operations after magnification correction control of color copier 300;

Each of FIGS. 17(A) and 17(B) is a diagram illustrating an example of shrinkage of a sheet size in the case of double-face image forming;

Each of FIGS. 18(A)-18(I) is a time chart showing an example of image size correction (K-color basis) in the case of switching trays in an image writing unit for each of Y-color, M-color, C-color and K-color in conventional examples; and Each of FIGS. 19(A)-19(O) is a time chart showing an example of operations (Y-color basis) in the case of front-face/rear-face magnification correction of a color image forming apparatus.

DETAILED DESCRIPTION OF THE PREFERRED EMBODIMENT

An image forming apparatus relating to an example of the invention will be explained as follows, referring to the drawings.

Embodiment 1

Figure 1:
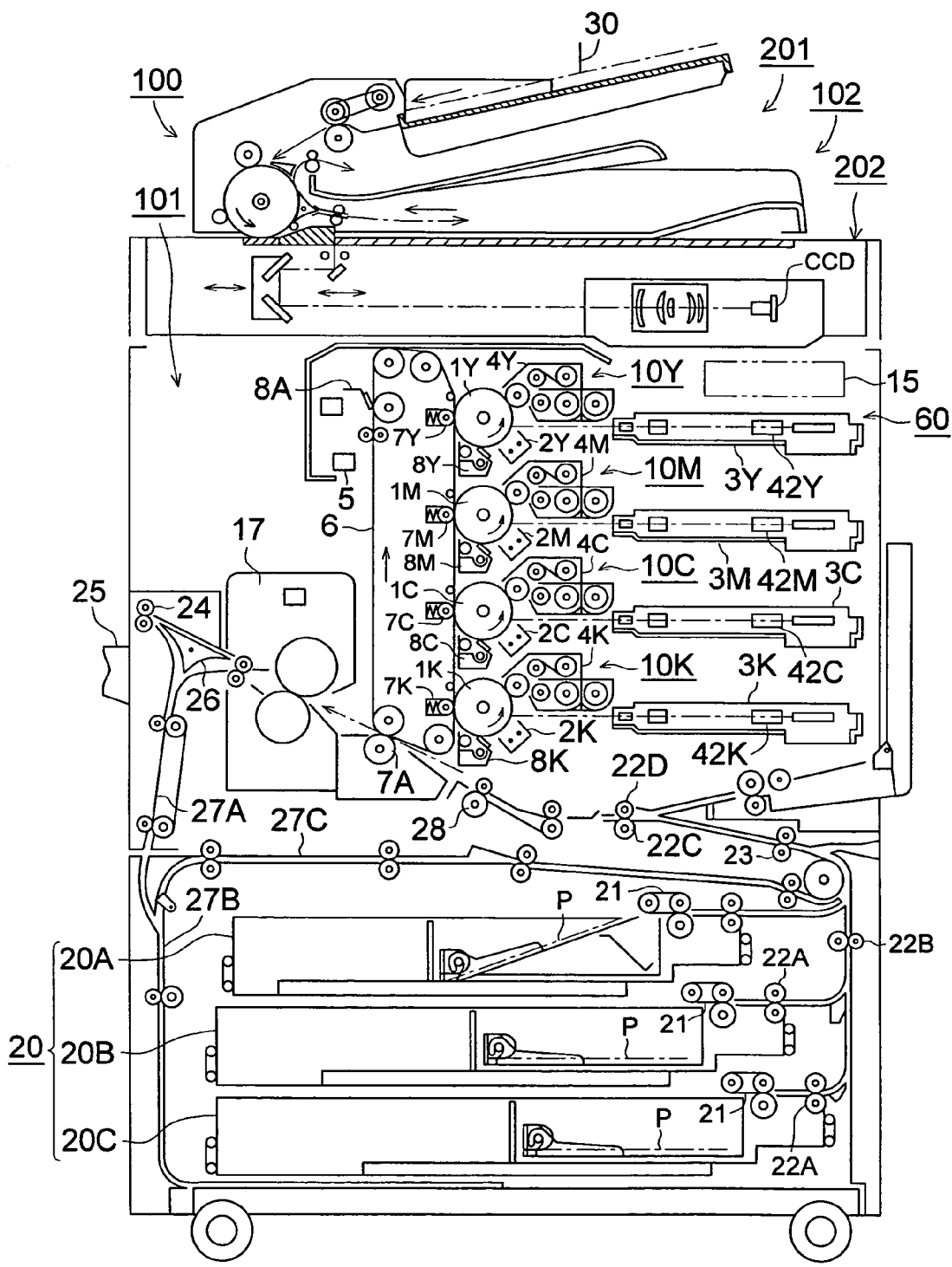
FIG. 1 is a conceptual diagram showing an example of configuration of color copier 100 as the first embodiment of the invention.

FIG. 1 is a conceptual diagram showing an example of configuration of a section of color copier 100 as the first embodiment of the invention.

Color copier 100 shown in FIG. 1 is an example of the first, second or third image forming apparatus representing an apparatus that has a function to correct image sizes by one page unit and is capable of forming continuously color images composed of at least two or more colors. An image forming apparatus relating to the invention may also be applied to a color printer, a facsimile machine and their multifunctional machine, in addition to the color copier 100.

The color copier 100 is composed of copier main body 101 and image reading unit 102. The image reading unit 102 composed of automatic document feeder 201 and document image scanning exposure unit 202 is arranged on the top of the copier main body 101. Document 30 placed on a document table of the automatic document feeder 201 is conveyed by an unillustrated conveyer, and thereby images on one side or two sides of the document are subjected to scanning exposure by the optical system of the document image scanning exposure unit 202, and an incident light reflecting document images is read by line image sensor CCD.

Analog image signals converted photoelectrically by line image sensor CCD are subjected to analog processing, A/D conversion, shading correction and image compression processing in an unillustrated image processing section, to become digital image data Din. The image data Din are sent to image writing units (laser writing units) 3Y, 3M, 3C and 3K constituting image forming section 60, after being converted to image data Dy, Dm, Dc and Dk for image forming for Y-color, M-color, C-color and K-color.

The aforesaid automatic document feeder 201 reads contents in document 30 fed from the document table by one effort continuously, and accumulates contents of the document in a memory section (electronic RDH function). This electronic RDH function is used conveniently when copying contents of many documents by a copying function, or when sending many documents 30 by a facsimile function.

The copier main body 101 constitutes a tandem type color image forming apparatus, and is provided with four image forming units (image forming systems) 10Y, 10M, 10C and 10K, endless intermediate transfer belt 6, a sheet conveying section including a sheet re-feeding mechanism (ADU mechanism), fixing unit 17 for fixing a toner image and with sheet feeding section 20 that feeds a transfer material (hereinafter referred to as a sheet) to an image forming system. The sheet feeding section 20 is provided below the image forming system. The sheet feeding section 20 is composed, for example, of three sheet feeding trays 20A, 20B and 20C. Sheet P fed out of the sheet feeding section 20 us conveyed to the lower part of the image forming unit 10K.

Image forming units 10Y, 10M, 10C and 10K constitute image forming section 60, and a polygon mirror and a photoreceptor drum are provided for each color, and they form color images on prescribed sheet P based on main scanning basis signal (hereinafter referred to as index signal) and/or on pseudo main scanning basis signal).

For example, image forming unit 10Y has polygon mirror 42Y and photoreceptor drum (image carrier) 1Y, image forming unit 10M has polygon mirror 42M and photoreceptor drum (image carrier) 1M, image forming unit 10C has polygon mirror 42C and photoreceptor drum (image carrier) 1C and image forming unit 10K has polygon mirror 42K and photoreceptor drum (image carrier) 1K. Each of the polygon mirrors 42Y-42K is provided independently of others, and scanning beams of the polygon mirrors 42Y-42K form latent images which are developed through development into color images.

In this example, the image forming unit 10Y for forming a yellow (Y) color image has therein photoreceptor drum 1Y for forming a Y-color toner image, charging unit 2Y for Y-color image forming arranged around the photoreceptor drum 1Y, image writing unit 3Y, developing unit 4Y and cleaning section 8Y for the image carrier.

The image forming unit 10M for forming a magenta (M) color image has therein photoreceptor drum 1M for forming a M-color toner image, charging unit 2M for M-color image forming, image writing unit 3M, developing unit 4M and cleaning section 8M for the image carrier. The image forming unit 10C for forming a cyan (C) color image has therein photoreceptor drum 1C for forming a C-color toner image, charging unit 2C for C-color image forming, image writing unit 3C, developing unit 4C and cleaning section 8C for the image carrier. The image forming unit 10K for forming a black (K) color image has therein photoreceptor drum 1K for forming a K-color toner image, charging unit 2K for K-color image forming, image writing unit 3K, developing unit 4K and cleaning section 8K for the image carrier.

A latent image forming section is constituted by a combination of charging unit 2Y and image writing unit 3Y, a combination of charging unit 2M and image writing unit 3M, a combination of charging unit 2C and image writing unit 3C, and a combination of charging unit 2K and image writing unit 3K. Development by each of developing units 4Y, 4M, 4C and 4K is carried out by reversal development in which developing bias where alternating voltage is superimposed on direct voltage whose polarity is the same as that of working toner (negative polarity in the present example) is impressed. The intermediate transfer belt 6 is trained about plural rollers, to be supported rotatably, and a Y-color toner image, a M-color toner image, a C-color toner image, and a K-color toner image formed respectively on respective photoreceptor drums 1Y, 1M, 1C and 1K are transferred onto the intermediate transfer belt 6.

An outline of image forming process will now be explained as follows. Images each having a different color formed respectively by image forming units 10Y, 10M, 10C and 10K are transferred onto rotating intermediate transfer belt 6(primary transfer) in order by primary transfer rollers 7Y, 7M, 7C and 7K on each of which primary transfer bias (not shown) having polarity opposite to that of working toner (positive polarity in the present example), thus, color toner images are superimposed to form a color image. The color image is transferred onto sheet P from the intermediate transfer belt 6.

Sheet P loaded in each of sheet feeding trays 20A, 20B and 20C is fed by feed out roller 21 and sheet feeding roller 22A which are provided on each of the sheet feeding trays 20A, 20B and 20C to be conveyed to secondary transfer roller 7A through conveyance rollers 22B, 22C, 22D and registration rollers 23 and 28, whereby, color images are transferred collectively onto the surface on one side (front face) of sheet P (secondary transfer).

The sheet P onto which the color image has been transferred is subjected to fixing processing by fixing unit 17, and is interposed by sheet ejection rollers 24 to be conveyed to sheet ejection tray 25. Toner remaining on a circumferential surface on each of photoreceptor drums 1Y, 1M, 1C and 1K after transferring is removed by each of image carrier cleaning sections 8Y, 8M, 8C and 8K, to be ready for the succeeding image forming cycle.

In the case of double-face image forming, sheet P which has been subjected to image forming on the surface (front face) of its one side and has been ejected from fixing unit 17 is branched from a sheet ejecting path by branch section 26, then, passes through lower circulating sheet path 27A to be reversed inside out by reversing conveyance path 27B representing a sheet re-feeding mechanism (ADU mechanism), and passes through sheet re-feeding conveyance section 27C to join at sheet feeding roller 22D. The sheet P which has been reversed and conveyed passes through registration rollers 23 and 28 to be conveyed again to secondary transfer roller 7A where color images (color toner images) are transferred collectively onto the surface (rear face) on the other side of the sheet P.

In the case of image forming stated above, sheet P to be used includes a thin sheet of about 52.3-63.9 kg/m² (1000 sheets), a regular sheet of about 64.0-81.4 kg/m² (1000 sheets), a thick sheet of about 83.0-130.0 kg/M² (1000 sheets) and a super-thick sheet of about 150.0 kg/m² (1000 sheets).

The sheet P onto which the color image has been transferred is subjected to fixing processing by fixing unit 17, and is interposed by sheet ejection rollers 24 to be conveyed to sheet ejection tray 25. On the other hand, after a color image is transferred onto sheet P by secondary transfer roller 7A, intermediate transfer belt 6 from which the aforesaid sheet P is separated through curvature is cleaned by cleaning section 8A for an intermediate transfer belt so that residual toner is removed. In this example, registration sensor 5 representing an example of a detection section for color registration error is arranged at the upstream side of the cleaning section 8A, to detect color registration errors of each color image formed on the intermediate transfer belt 6.

Copier main body 100 is equipped with controller 15 that conducts simultaneously controlling to change a rotation speed of polygon mirror 42Y or the like for changing an image size in the sub-scanning direction and controlling to adjust rotation phase of the polygon mirror 42Y depending on an amount of correction for color registration errors after the correction (first image forming apparatus). The controller 15 constitutes a part of a color registration error correcting section, and it corrects color registration errors depending on an amount of detection for color registration error obtained from registration sensor 5. For example, a minute amount of registration error in the sub-scanning direction can be adjusted by conducting phase control (which is also called plane phase control) for each of polygon mirrors 42Y-42K by the controller 15.

Figure 2:
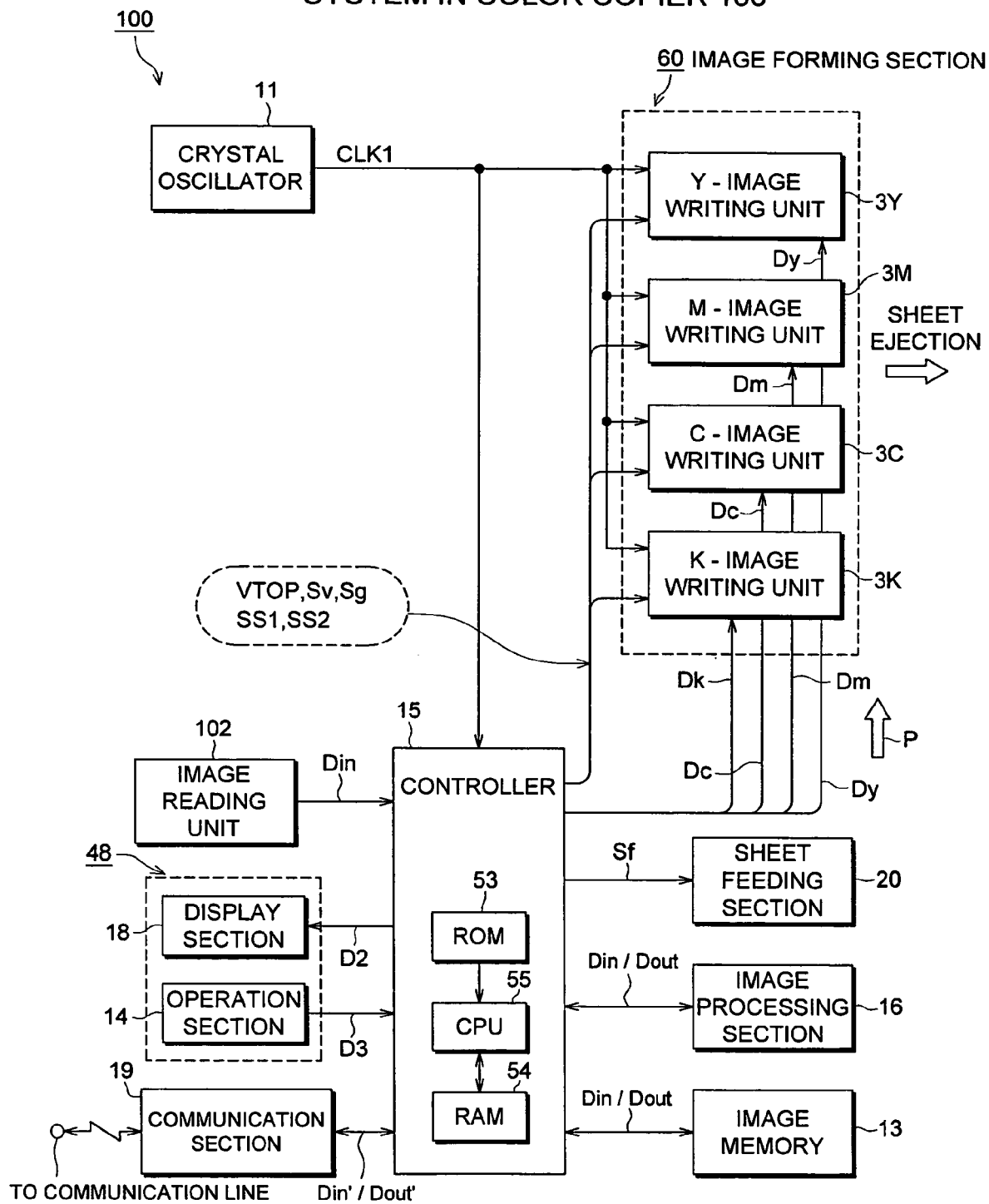
FIG. 2 is a block diagram showing an example of configuration of a control system of the color copier 100.

FIG. 2 is a block diagram showing an example of configuration of a control system of the color copier 100. The color copier 100 shown in FIG. 2 has therein controller 15 that determines timing to start image forming on a prescribed surface of sheet P based on basis signal (hereafter, index signal for each color image forming is called YIDX, MIDX, CIDX or KIDX) for forming Y-color image, M-color image, C-color image or K-color image. The basis signal in this case means main scanning basis signal (INDEX signal) to be generated by detecting a laser (exposure) beam oscillated by polygon mirror 42Y of each color image forming unit.

Crystal oscillator (source oscillator) 11, image memory 13, image processing section 16, communication section 19, sheet feeding section 20, operation panel 48, image forming section 60 and image reading unit 102 are connected to the controller 15.

The crystal oscillator 11 oscillates basis clock signal (hereinafter referred to as CLK1 signal) representing a basis signal in the case of color image forming. The CLK1 signals oscillated by the crystal oscillator 11 are outputted, for example, to image writing units 3Y, 3M, 3C and 3K which are respectively for Y-color image forming, M-color image forming, C-color image forming and K-color image forming.

The controller 15 has therein ROM (Read Only Memory) 53, RAM (Random Access Memory) 54 for work and CPU (Central Processing Unit; central processing unit) 55. System program data for controlling the overall copier and information for controlling a rotation speed and a phase of polygon mirror 42 are stored in the ROM 53. These pieces of information include counter control signals (hereinafter referred to as CNTPRD signals) and phase control signals (hereinafter referred to as PHASE signals). The RAM 54 stores temporarily control command in implementation of various modes.

When power supply is turned on, CPU 55 starts the system by reading system program data from ROM 53, and controls the overall copier. The CPU 55, for example, executes control of color image forming on a prescribed surface of sheet P based on CLK1 signal and YIDX signal, when forming a color image on prescribed sheet P on a basis of Y-color. With regard to the YIDX signal, its cycle varies depending on rotation speed control and phase control for polygon mirror 42Y. The CPU 55 determines image leading edge signal in color image forming processing from a front face to a rear face of sheet P (hereinafter referred to as VTOP signal) and VTOP signal in color image forming processing in the case of switching from tray 1 to tray 2. The VTOP signal is a signal for synchronizing timing for conveying sheet P with timing for image forming.

The image forming section 60 is equipped with image writing units 3Y, 3M, 3C and 3K which are respectively for image forming for Y-color, M-color, C-color and K-color. In the color image forming, the CPU 55 establishes frequency control signal Sg, CNTPRD signal and PHASE signal on each of the image writing units 3Y, 3M, 3C and 3K. In Y-image writing unit 3Y, image data Dy for Y-color image forming are inputted from image memory for Y-color image forming, and actions are taken to form Y-color toner images based on frequency control signal Sg, CNTPRD signal, PHASE signal, CLK1 signal and an unillustrated YIDX signal. The YIDX signal is a basis signal in the case of controlling a rotation speed and a phase of polygon mirror 42Y for Y-color image forming and thereby scanning photoreceptor drum 1Y with a laser beam, and it is a signal obtained by detecting a laser beam reflected on polygon mirror 42Y.

Equally, in M-image writing unit 3M, image data Dm for M-color image forming are inputted from image memory for M-color image forming, and actions are taken to form M-color toner images based on frequency control signal Sg, CNTPRD signal, PHASE signal, CLK1 signal and MIDX signal. The MIDX signal is a basis signal in the case of controlling a rotation speed and a phase of polygon mirror 42M for M-color image forming and thereby scanning photoreceptor drum 1M with a laser beam, and it is a signal obtained by detecting a laser beam reflected on polygon mirror 42M.

In C-image writing unit 3C, image data Dc for C-color image forming are inputted from image memory for C-color image forming, and actions are taken to form C-color toner images based on frequency control signal Sg, CNTPRD signal, PHASE signal, CLK1 signal and CIDX signal. The CIDX signal is a basis signal in the case of controlling a rotation speed and a phase of polygon mirror 42C for C-color image forming and thereby scanning photoreceptor drum 1C with a laser beam, and it is a signal obtained by detecting a laser beam reflected on polygon mirror 42C.

In K-image writing unit 3K, image data Dk for K-color image forming are inputted from image memory for K-color image forming, and actions are taken to form K-color toner images based on frequency control signal Sg, CNTPRD signal, PHASE signal, CLK1 signal and KIDX signal. The KIDX signal is a basis signal in the case of controlling a rotation speed and a phase of polygon mirror 42K for K-color image forming and thereby scanning photoreceptor drum 1K with a laser beam, and it is a signal obtained by detecting a laser beam reflected on polygon mirror 42K.

In this example, the controller 15 executes color image forming control on a prescribed surface of sheet P based on YIDX signal and VTOP signal. Due to this, it is possible to correct image size on each of the front face and the rear face of sheet P, even when sheet P shrinks after image forming on the front face, when forming images on both the front face and the rear face of the sheet. It is further possible to correct an image size on a different sheet, even when a type of a sheet on tray 1 is different from that of a sheet on tray 2, when forming color images after switching sheet feeding from tray 1 to tray 2.

Incidentally, operation panel 48 is connected to the controller 15, and has therein operation section 14 composed of a touch panel and display section 18 composed of liquid crystal display panel, both of which are not illustrated. An input section of a type of GUI (Graphic User Interface) is used for the operation panel 48. A power supply switch is provided on the operation panel 48. The display section 18 conducts display operations, interlocking with, for example, operation section 14.

The operation panel 48 is operated when selecting image forming conditions and selecting sheet feeding trays 20A-20C. For example, operation section 14 is operated when selecting a type of sheet P (sheet type) from a regular sheet, a recycled sheet, coated paper and OHT sheet and when selecting a sheet feeding tray storing therein the selected sheet from sheet feeding trays 20A-20C, thus, image forming conditions are established. Incidentally, the image forming conditions established by the operation panel 48 and information of the selected sheet feeding tray are outputted to the CPU 55 as operation data D3.

The aforesaid controller 15 executes color image forming on a prescribed surface of sheet P based on operation data D3 outputted from operation section 14 or on information received through communication section 19. For example, the aforesaid controller 15 executes processing to adjust an image size between the front face and the rear face of sheet P and processing to adjust a position between the front face and the rear face of sheet P, corresponding to a type of set sheet P or to set sheet feeding trays 20A-20C.

Image reading unit 102 is connected to the controller 15, and it reads images from document 30 shown in FIG. 1 to output image data Din (each color component data for R, G and B) for digital color to the controller 15. In the controller 15, image data Din are stored in image memory 13. Image processing section 16 reads image data Din from image memory 13, and conducts processing to convert color component data for R, G and B into image data Dy for Y-color image forming, image data Dm for M-color image forming image data Dc for C-color and image data Dk for K-color image forming. Image data Dy, Dm, Dc and Dk respectively for Y-color image forming, M-color image forming, C-color image forming and K-color image forming are stored in image memory 13 or in an unillustrated image memory for Y-color image forming, M-color image forming, C-color image forming and K-color image forming.

Communication section 19 is connected to a communication line such as LAN, and is used when communicating with outside computers. When the color copier 100 is used as a printer, the communication section 19 is used to receive print data Din' from outside computers, in the mode of printing operation. Incidentally, print data Din' include image forming conditions and information of selecting sheet feeding trays. Those received from outside computers through communication section 19 may also be used as the image data Dy, Dm, Dc and Dk respectively for Y-color, M-color, C-color and K-color image forming.

Sheet feeding section 20 is connected to an unillustrated motor for driving sheet feeding trays 20A-20C, and it controls rotation of the motor based on sheet feeding control signal Sf, and operates to convey sheet P fed out of the sheet feeding tray 20A, 20B or 20C to the image forming system. The sheet feeding control signal Sf is supplied to sheet feeding section 20 from the controller 15.

Figure 3:
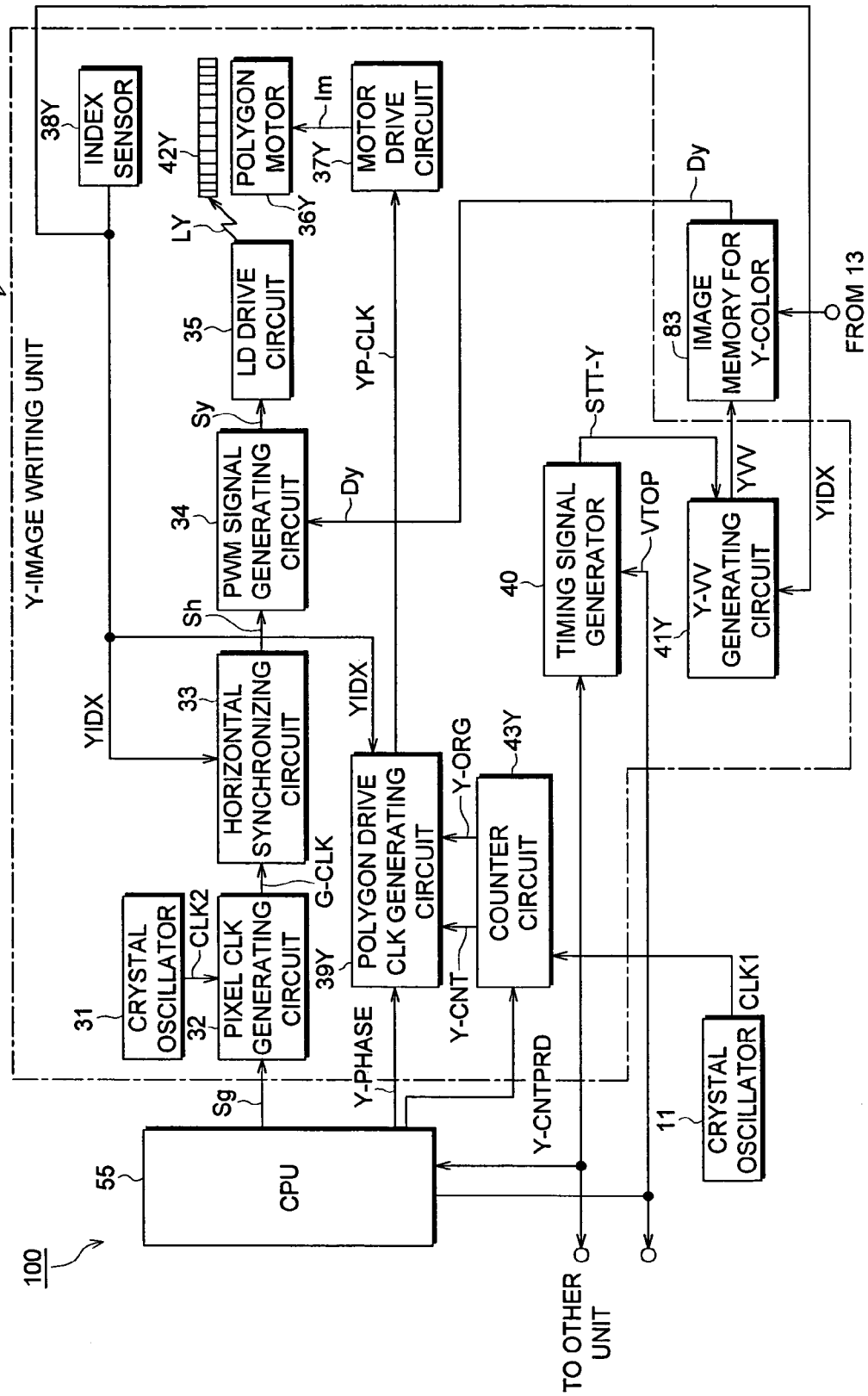
FIG. 3 is a block diagram showing an example of configuration of image writing unit 3Y for Y-color image forming shown in FIG. 2 and its peripheral circuit.

FIG. 3 is a block diagram showing an example of configuration of image writing unit 3Y for Y-color image forming shown in FIG. 2 and its peripheral circuit.

Y-color image writing unit 3Y shown in FIG. 3 is connected to crystal oscillator 11 and to CPU 55. The Y-color image writing unit 3Y is composed, for example, of crystal oscillator 31, pixel CLK generating circuit 32, horizontal synchronizing circuit 33, PWM signal generating circuit 34, laser (LD) drive circuit 35, polygon motor 36Y, motor drive circuit 37Y, index sensor 38Y, polygon drive CLK generating circuit 39Y, timing generator 40, Y-VV (Valid) generating circuit 41 and counter circuit 43Y.

Counter circuit 43Y is one for determining a cycle of YP-CLK signal that controls a rotation speed of polygon mirror 42Y, and it counts the number of pulses of CLK signals based on Y-CNTPRD signal, and outputs Y-CNT signal of the first cycle and Y-ORG signal of the second cycle. CLK1 signal is outputted to counter circuit 43Y from crystal oscillator 11. The Y-CNTPRD signal is a signal to establish a target count value of counter circuit 43Y, and it is a signal to establish a cycle of YP-CLK signal, namely, a speed of polygon motor 36Y. Y-CNTPRD signal is outputted to counter circuit 43Y from CPU 55 in the case of image forming on the front face and the rear face. This signal is used for controlling a rotation speed of polygon mirror 42Y. Y-CNT signal and Y-ORG signal are outputted to polygon drive CLK generating circuit 39Y from counter circuit 43Y.

To counter circuit 43Y and CPU 55, there is connected polygon drive CLK generating circuit 39Y, and Y-PHASE signal, Y-CNT signal, Y-ORG signal and YIDX signal are inputted to be processed to generate polygon drive clock signal (YP-CLK signal) for Y-color image forming. The Y-PHASE signal is a signal that establishes an amount of phase adjustment on the polygon drive CLK generating circuit 39Y, and it is used for controlling a phase of polygon mirror 42Y. Further, on the polygon drive CLK generating circuit 39Y, rotation speeds of polygon mirrors 42Y-42K are changed.

The YIDX signal is outputted to the polygon drive CLK generating circuit 39Y from index sensor 38Y. CLK1 signal is outputted to the polygon drive CLK generating circuit 39Y from crystal oscillator 11. An example of internal configurations of the polygon drive CLK generating circuit 39Y will be explained, referring to FIG. 4.

Motor drive circuit 37Y is connected to the polygon drive CLK generating circuit 39Y. The motor drive circuit 37Y is connected to polygon motor 36Y, to drive the polygon motor 36Y based on YP-CLK signal. Polygon mirror 42Y is mounted on the polygon motor 36Y to be rotated by drive power of the polygon motor 36Y in the main scanning direction.

Laser beam LY radiated from an unillustrated diode is oscillated for main scanning when polygon mirror 42Y is rotated for photoreceptor drum 1Y rotating in the sub-scanning direction, in the aforesaid LD drive circuit 36, whereby an electrostatic latent image is formed on the photoreceptor drum 1Y. The electrostatic latent image formed on the photoreceptor drum 1Y is developed with toner member for Y-color image forming. A Y-color toner image on the photoreceptor drum 1Y is transferred onto intermediate transfer belt 6 rotating in the sub-scanning direction (primary transfer).

In the mean time, crystal oscillator 31 oscillates basis clock signals (hereinafter referred to as CLK2 signals) and outputs them to pixel CLK generating circuit 32 which is connected to the crystal oscillator 31. The pixel CLK generating circuit 32 constitutes a pixel clock frequency changing section, and operates to generate pixel clock signals for Y-color image forming (hereinafter referred to as G-CLK signals) based on frequency control signal Sg outputted by CPU 55 and thereby to output to horizontal synchronizing circuit 33.

The pixel CLK generating circuit 32 changes a pixel clock frequency depending on an amount of change in rotation speed for each of polygon mirrors 42Y-42K and an amount of adjustment of lateral magnification. For example, a value obtained by multiplying frequency f0 of G-CLK signal in the case of image forming on the front face and (L/L')·(W/W') together is established as Y-color image forming pixel CLK frequency f in the case of image forming on the rear face. The aforesaid pixel CLK generating circuit 32 and the polygon drive CLK generating circuit 39Y constitute a magnification correcting section which corrects magnifications in terms of image sizes by one page unit.

The horizontal synchronizing circuit 33 is connected to the pixel CLK generating circuit 32 and to PMW signal generating circuit 34, and detects horizontal synchronizing signal Sh based on YIDX signal to output to the PMW signal generating circuit 34. The YIDX signal is outputted from index sensor 38Y for Y-color image forming not only to the horizontal synchronizing circuit 33 but also to polygon drive CLK generating circuit 39Y. The index sensor 38Y is composed of a light-receiving element.

The PMW signal generating circuit 34 inputs image data Dy for Y-color image forming from image memory 83 for Y-color image forming, and modulates the image data Dy in terms of pulse width to output laser drive signal Sy for Y-color image forming to LD drive circuit 35. The aforesaid PMW signal generating circuit 34 is connected with LD drive circuit 35. The LD drive circuit 35 is connected with an unillustrated laser diode. The LD drive circuit 35 drives the laser diode based on laser drive signal Sy, and generates laser beam LY for Y-color image forming to radiate to polygon mirror 42Y.

To the aforesaid crystal oscillator 11, connected is timing signal generator 40 for determining image forming start timing for Y-color image forming. The timing signal generator 40 is further connected with CPU 55, and counts the number of pulses of YIDX signals based on VTOP signals outputted from the CPU 55 in the case of image forming on the front face, for example, to determine image forming start timing for Y-color image forming on the front face of the sheet based on the number of the counted pulses. Concurrently with this determining of image forming start timing for Y-color image forming, image forming start signals (hereinafter referred to as STT signals) are outputted to Y-VV creating circuit 41Y.

The Y-VV creating circuit 41Y counts the number of pulses of YIDX signals based on STT signals outputted from the timing signal generator 40 to create sub-scanning effective area signal (hereinafter referred to as YTV signal) for Y-color image forming on the front face of the sheet based on the number of the counted pulses. The YVV signal is outputted to image memory 83 for Y-color image forming.

To the aforesaid PMW signal generating circuit 34, there is connected image memory 83 for Y-color image forming, so that image data Dy for Y-color image forming may be read out based on YVV signal in the case of forming images on both the front face and the rear face of the sheet. With regard to the image data Dy, image data for R, G and B colors are read out from image memory 13 shown in FIG. 2 in image processing section 16, and the image data for R, G and B colors represent one of image data for Y, M, C and K colors converted in terms of a color.

Further, the timing signal generator 40 counts the number of pulses of YIDX signals based on VTOP signals outputted from CPU 55, immediately before the start of image forming on the rear face f the sheet, for example, to determine image forming start timing for Y-color image forming on the rear face of the sheet based on the number of the counted pulses. Concurrently with this determining of image forming start timing for Y-color image forming, STT signals (image forming start signals) are outputted to Y-VV creating circuit 41Y.

Y-VV creating circuit 41Y counts the number of pulses of YIDX signals based on STT signals outputted from timing signal generator 40, to create YVV signals for Y-color image forming on the rear face of the sheet based on the number of the counted pulses. YVV signals are outputted to image memory 83 for Y-color image forming.

In the mean time, since each of other image writing units 3M, 3C and 3K has also the configuration and function which are the same as those in the foregoing, descriptions for them will be omitted. In the present example, an explanation has been given by including crystal oscillator 31, pixel CLK generating circuit 32, horizontal synchronizing circuit 33, PWM signal generating circuit 34, polygon drive CLK generating circuit 39Y, timing generator 40, Y-VV generating circuit 41 and counter 43Y in the image writing unit 3Y. However, the invention is not limited to this, and these circuit elements may also be included in image processing section 16 or in controller 15 for the configuration.

In that case, it is also possible to employ a configuration wherein CPU 55 is caused to have functions of the timing generator 40, VTOP signal is started based on CLK1 signal in the case of image forming on the front face of the sheet, the number of pulses of YIDX signals is counted based on the VTOP signal, and first image forming start timing for Y-color on the front face of the sheet is determined based on the number of counted pulses. Based on the STT signal (image forming start signal) determined here, the number of pulses of YIDX signals for Y-color image forming is counted, and image writing unit 3Y is controlled so that YVV signal for Y-color image forming on the front face of the sheet may be created based on the number of counted pules.

In the case of image forming on the rear face of the sheet, CPU 55 starts VTOP signal based on CLK1 signal, then, counts the number of pulses of YIDX signals based on the VTOP signal, and determines first image forming start timing for Y-color for the rear face of the sheet based on the number of counted pulses.

The CPU 55 may also be made up to control input and output of image writing unit 3Y so that the number of pulses of YIDX signal for each color image forming are counted based on the determined image forming start timing, and YVV signal for Y-color image forming on the rear face of the sheet is created based on the number of the counted pulses.

In the present example, the CPU 55 controls a frequency of YP-CLK signal for each color in the order wherein image forming on the front face of the sheet for each of respective colors is completed, to establish a rotation speed of polygon mirror 42Y for the rear face of the sheet, and then, executes phase control for the MST-IDX.

If the control is operated as stated above, it is possible to carry out the control such as the rotation speed change and phase change of the polygon mirror 42Y, after completion of image forming for respective colors, based on MST-IDX signal established to a prescribed cycle, without depending on IDX signal of basis color.

Due to this, it is possible to carry out the control such as the rotation speed change and phase change of the polygon mirror for that color image forming, by waiting neither stabilization of the rotation speed of polygon mirror 42K established to the basis color, nor adjustment of timing until the start of image forming for all of other colors.

Figure 4:
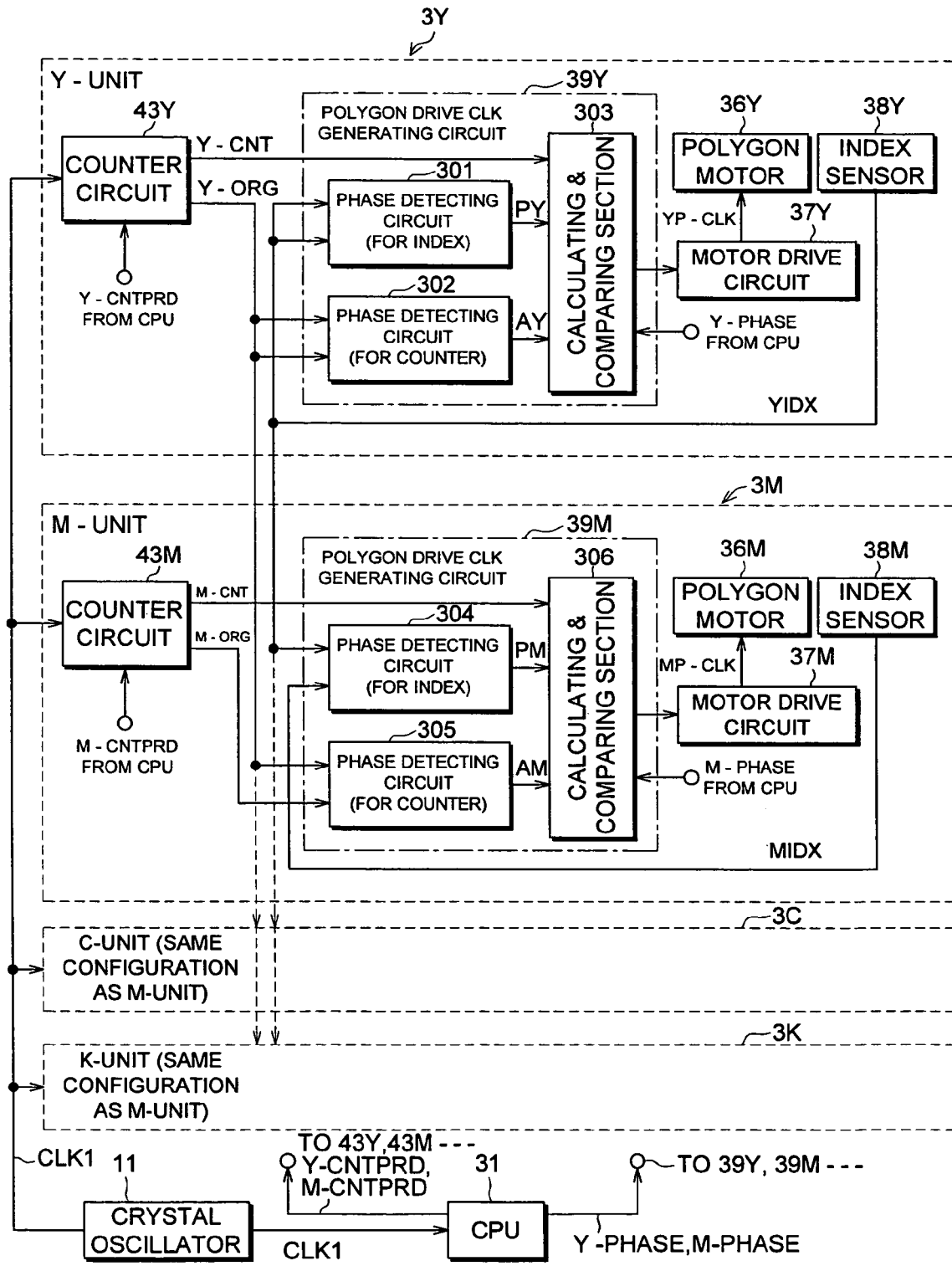
FIG. 4 is a block diagram showing an example of configuration of a polygon mirror drive system for each color image forming.

FIG. 4 is a block diagram showing an example of configuration of a polygon mirror drive system for each color image forming, and it is a diagram wherein polygon mirror drive system (hereinafter referred to simply as Y, M, C or K unit) for each color image forming is extracted from image writing units 3Y, 3M, 3C and 3K for respective colors shown in FIG. 2.

Y unit 3Y shown in FIG. 4 is composed of counter circuit 43Y, polygon drive CLK generating circuit 39Y, motor drive circuit 37Y, polygon motor 36Y and index sensor 38Y.

The counter circuit 43Y determines output timing of YP-CLK signal for driving polygon motor 36Y (polygon mirror 42Y). This output timing means a rising edge and falling edge of YP-CLK signal. When Y-color image forming is made to be a basis, CPU 55 determines output timing of YP-CLK signal for the succeeding page, based on output value Y-CNT signal of counter circuit 43Y, a phase difference between YIDX signal and YIDX signal, a phase difference between a base point of count cycle of Y-ORG signal by counter circuit 43Y and a base point of count cycle of Y-ORG signal by counter circuit 43Y, and on Y-PHASE signal showing an amount of phase control of polygon mirror 42Y. The amount of phase control mentioned here means one which is calculated by correcting an amount of correction for color registration errors before correction of magnification for image size in accordance with an amount of adjustment of magnification.

The CPU 55 controls individually a count cycle established independently of each of polygon mirrors 42Y-42K, based on CLK1 signal though counter circuits 43Y, $#M, 43C and 43K. The CPU 55 controls counter circuits 43Y, 43M, 43C and 43K, based on YP-CLK signal outputted from polygon drive CLK generating circuit 39Y, so that the count cycle may be the same regarding image forming of the same page, when driving polygon motor 36Y, and establishes count cycle individually on each of image forming units 10Y, 10M, 10C and 10K for each color, to execute speed control.

Polygon drive CLK generating circuit 39Y is connected with counter circuit 43Y, and generates YP-CLK, referring to output values of the counter circuit 43Y. The polygon drive CLK generating circuit 39Y has therein phase detection circuit 301 for index use, phase detection circuit 302 for counter use and calculating & comparing section 303.

In the phase detection circuit 301 for index, phase difference PY between YIDX signal for Y-color image forming and YIDX signal is detected. In the phase detection circuit 302 for counter, phase difference AY between a base point of a count cycle of Y-ORG signal by counter circuit 43Y for Y-color image forming and a base point of a count cycle of Y-ORG signal is detected. To the phase detection circuits 301 and 302, there is connected calculating & comparing section 303 constituting an example of a calculation section which carry out an operation for phase difference PY, phase difference AY and Y-PHASE to calculate an amount of phase adjustment. In the present example, "an amount of phase adjustment=0" is outputted because of Y-color image forming basis. The calculating & comparing section 303 executes polygon mirror drive control in the case of magnification correction in terms of an image size, with YP-CLK signal for controlling a rotation speed of polygon mirror 42Y generated based on the result of the operation.

To the counter circuit 43M, there is connected polygon drive CLK generating circuit 39M which generates MP-CLK, referring to the output value of the counter circuit 43M. The polygon drive CLK generating circuit 39M has therein phase detection circuit 304 for index, phase detection circuit 305 for counter and calculating & comparing section 306.

In the phase detection circuit 304 for index, phase difference PM between YIDX signal for Y-color image forming and MIDX signal is detected. The phase difference PM between YIDX signal and MIDX signal in this case means a phase difference between a main scanning basis signal for Y-color image writing unit 3Y immediately before conducting magnification correction in terms of an image size and main scanning basis signal for M-color image writing unit 3M. In the phase detection circuit 305 for counter, phase differences AM and AM' each between a base point of a count cycle of Y-ORG signal by counter circuit 43Y for Y-color image forming and a base point of a count cycle of M-ORG signal for M-color image forming is detected. This phase difference AM is one between a base point of a count cycle of counter circuit 43Y for Y-color image writing unit 3Y immediately before conducting magnification correction in terms of an image size and a base point of a count cycle of counter circuit 43M for M-color image writing unit 3M, while, phase difference AM' is a phase difference from a base point of a count cycle in the state where counter circuits 43Y and 43M after magnification correction in terms of an image size arrive at a count cycle.

To the phase detection circuits 304 and 305, there is connected calculating & comparing section 306 which carries out an operation for phase difference PM, phase differences AM and AM' as well as M-PHASE to calculate an amount of phase adjustment. In addition to Y unit 3Y and M unit 3M, C-K units have the same configuration and are equipped with the same functions. Therefore, explanation for them will be omitted here.

Each of FIGS. 5(A)-5(F) is a time chart showing an example of operations (YP-CLK basis time) before magnification correction control in image forming section 60. In the present example, there is shown the state before magnification correction control in the occasion where YP-CLK signal is a basis (CNTPRD Y=CNTPRD M=N1).

YIDX signals shown in FIG. 5(A) are outputted from index sensor 38Y shown in FIG. 4 before magnification correction control to phase detection circuits 301 and 304. Y-CNT signal shown in FIG. 5(B) is outputted from counter circuit 43Y shown in FIG. 4 to calculating & comparing section 303. In FIG. 5(B), a counter cycle is set by Y-CNTPRD signal to output value N1.

YP-CLK signal shown in FIG. 5(C) is outputted from calculating & comparing section 303 shown in FIG. 4 to motor drive circuit 37Y. In FIG. 5(C), period (t5-t1) is a clock cycle of YP-CLK signal before magnification correction control. At the point in time when counter circuit 43Y counts N1/2, YP-CLK signal is reversed from a high level to a low level.

MIDX signal shown in FIG. 5(D) is outputted from index sensor 38M shown in FIG. 4 before magnification correction control to phase detection circuit 304. M-CNT signal shown in FIG. 5. (E) is outputted from counter circuit 43M shown in FIG. 4 to calculating & comparing section 306. In FIG. 5 (E), a counter cycle is set by M-CNTPRD signal to output value N1. MP-CLK signal shown in FIG. 5(F) is outputted from calculating & comparing section 306 to motor drive circuit 37Y. In FIG. 5(F), period (t6-t2) is a clock cycle of MP-CLK signal before magnification correction control. At the point in time when counter circuit 43M counts N1/2, MP-CLK signal is reversed from a high level to a low level.

In this example, when AI represents a phase difference between rising time t1 of YP-CLK signal shown in FIG. 5(C), namely, a count base point of counter circuit 43Y for Y-color image forming and rising time t2 of MC-CLK signal, namely, a count base point of counter circuit 43M for M-color image forming, phase detection circuit 305 detects this phase difference A1.

Further, when P1 represents a phase difference between rising time t3 of YIDX signal shown in FIG. 5(A) and rising time t4 of MIDX signal shown in FIG. 5(D), phase detection circuit 304 detects this phase difference P1. In the mean time, E1 represents a rising edge of MP-CLK signal for M-color image forming before magnification correction control shown in FIG. 5(E). In the present example, E1 equals 1.

Each of FIGS. 6(A)-6(F) is a time chart showing an example of operations (YP-CLK signal basis time) after magnification correction control in image forming section 60. In this example, there is shown the state after magnification correction control in the occasion where YP-CLK signal is a basis (CNTPRD Y=CNTPRD M=N1).

YIDX signals shown in FIG. 6(A) are outputted from index sensor 38Y shown in FIG. 4 after magnification correction control to phase detection circuits 301 and 304. Y-CNT signal shown in FIG. 6(B) is outputted from counter circuit 43Y shown in FIG. 4 to calculating & comparing section 303. In FIG. 6(B), a counter cycle is set by Y-CNTPRD signal to output value N2.

YP-CLK signal shown in FIG. 6(C) is outputted from calculating & comparing section 303 shown in FIG. 4 to motor drive circuit 37Y. In FIG. 6(C), period (t14-t11) is a clock cycle of YP-CLK signal after magnification correction control. At the point in time when counter circuit 43Y counts N2/2, YP-CLK signal is reversed from a high level to a low level.

MIDX signal shown in FIG. 6(D) is outputted from index sensor 38M shown in FIG. 4 after magnification correction control to phase detection circuit 304. M-CNT signal shown in FIG. 6(E) is outputted from counter circuit 43M shown in FIG. 4 to calculating & comparing section 306. In FIG. 6 (E), a counter cycle is set by M-CNTPRD signal to output value N2. MP-CLK signal shown in FIG. 6(F) is outputted from calculating & comparing section 306 to motor drive circuit 37Y. In FIG. 6(E), a clock of MP-CLK signal shown in FIG. 6(C) is caused to rise at E2.

In this example, when A2 represents a phase difference between rising time t11 of YP-CLK signal shown in FIG. 6(C), namely, a count base point of counter circuit 43Y for Y-color image forming and rising time t13 of MC-CLK signal, namely, a count base point of counter circuit 43M for M-color image forming, phase detection circuit 305 detects this phase difference A2.

When N1 represents a counter output value of MP-CLK signal before magnification correction control, N2 represents a counter output value of MP-CLK signal after magnification correction control, ΔP represents an amount of phase adjustment of polygon mirror 42M and P2 represents a phase difference between YIDX signal after magnification correction control and MIDX signal for M-color image forming, calculating & comparing section 306 carries out operation of the following expression (1).

$$P2=(P1+\Delta P)\times N2/N1 \qquad (1)$$

A counter base point for M-color image forming after magnification correction control shown in FIG. 6(E) is represented by E2. Together with this, the calculating & comparing section 306 carries out an operation for the following expression (2), when A1 represents a phase difference between a count base point of counter circuit 43Y for Y-color image forming before magnification correction control and a count base point of counter circuit 43M for M-color image forming, A2 represents a phase difference between a count base point of counter circuit 43Y for Y-color image forming after magnification correction control and a count base point of counter circuit 43M for M-color image forming, E1 represents a counter base point for M-color image forming before magnification correction control and E2 represents a rising edge of MP-CLK signal for M-color image forming for the succeeding page after magnification correction control.

$$E2=(A2-A1)+(P2-P1)+E1 \qquad (2)$$

By controlling drive of a polygon motor through this operation, it is possible to execute rotation speed control and phase control of polygon mirror 42Y simultaneously, and thereby to reduce a stabilizing time for rotation.

Incidentally, both C unit 3C and K unit 3K employ the same configuration as that of M unit 3M. CLK1 signals are supplied commonly to counter circuits 43Y, 43M, 43C and 43K respectively for Y-color, M-color, C-color and K-color image forming. Since the same operation is carried out also between counter circuit 43Y, 43C or 43K for other color image forming, an explanation will be omitted.

With regard to a rising edge position and a falling edge position for each of YP-CLK signal, MP-CLK signal, CP-CLK signal and KP-CLK signal, it is possible to determine output timing by deciding a counter value, by comparing counter circuits 43Y and 43M for generating YP-CLK signal, MP-CLK signal, CP-CLK signal and KP-CLK signal. Therefore, CPU 55 can execute speed control and phase control simultaneously without comparing phases of YIDX signal, MIDX signal, CIDX signal and KIDX signal newly, which can restrain a decline of productivity.

Each of FIGS. 7(A)-7(H) is a time chart showing an example of operations (Y-color basis) after magnification correction control of color copier 100.

The assumption of the present example is an occasion wherein Y-color image forming processing is executed on a sheet fed out of tray 2 after image forming processing on a sheet coming from tray 1 has been completed entirely. In this case, image forming processing on a sheet coming from tray 1 is made to be the state before magnification correction control, Y-color image forming processing on a sheet fed out of tray 2 is made to be-the state after magnification correction control. In the state before magnification correction control, in other words, in the state of giving no phase control amount ΔP, phase difference A1 between a count base point of counter circuit 43Y for Y-color image forming and a count base point of counter circuit 43M for M-color image forming is detected, and phase difference P1 between rising time of UIDX signal and rising time of MIDX signal is detected.

Before Magnification Correction Control

Under the foregoing serving as operation conditions, VTOP signal shown in FIG. 7(A) rises at time T21' when a leading edge of a sheet fed out of tray 1 is detected and the VTOP signal is synchronized with YIDX signal shown in FIG. 7 (D). YVV start timing shown in FIG. 7(B) rises at time T22' when an unillustrated YIDX counter is started, the number of pulses of YIDX signal is counted, and the YVV start timing is synchronized with the YIDX signal. YTV signal shown in FIG. 7(C) rises at time T23' when the Y V signal is synchronized with YIDX signal shown in FIG. 7(D). Y-color image forming is carried out on a sheet coming from tray 1 during the period of "H" level of the YVV signal.

In this case, YIDX signals shown in FIG. 5(A) are outputted to phase detection circuits 301 and 304 from index sensor 38Y shown in FIG. 4 before magnification correction control. Y-CNT signal shown in FIG. 5(B) is outputted to calculating & comparing section 303 from counter circuit 43Y shown in FIG. 4. In this case, a counter cycle shown in FIG. 5(B) is set to output value N1 by Y-CNTPRD signal. Further, YP-CLK signal shown in FIG. 5(C) is outputted from calculating & comparing section 303 to motor drive circuit 37Y. In the example shown in FIG. 5(C), period (t5-t1) is a clock cycle of YP-CLK signal before magnification correction control.

M-color image forming on a sheet coming from tray 1 is carried out during the period of "H" level of the MVV signal shown in FIG. 7(E). In this case, MIDX signal before magnification correction control shown in FIG. 5(D) is outputted to phase detection circuits 304 from index sensor 38Y shown in FIG. 4. M-CNT signal shown in FIG. 5(E) is outputted to calculating & comparing section 306 from counter circuit 43M shown in FIG. 4. Further, a counter cycle shown in FIG. 5(E) is set to output value N1 by M-CNTPRD signal. MP-CLK signal shown in FIG. 5(F) is outputted from calculating & comparing section 306 to motor drive circuit 37Y. In the example shown in FIG. 5(F), period (t6-t2) is a clock cycle of MP-CLK signal before magnification correction control.

C-color image forming on a sheet coming from tray 1 is carried out during the period of "H" level of the CVV signal shown in FIG. 7(F). KVV start timing shown in FIG. 7(G) rises at time T24' when an unillustrated KIDX counter is started, the number of pulses of YIDX signal is counted, and the KVV start timing is synchronized with the YIDX signal. KVV signal shown in FIG. 7(H) rises at time T25' when the KVV signal is synchronized with KIDX signal shown in FIG. 7 (I). K-color image forming is started at "H" level of the KVV signal, and K-color image forming is carried out on a sheet coming from tray 1 during the period of the "H" level.

After Magnification Correction Control

In the image forming unit 3Y wherein Y-color image forming on a sheet coming from tray 1 has been completed, rotation speed control for the polygon mirror for Y-color image forming is conducted for executing magnification correction control for image forming on the succeeding page. rotation speed control for the polygon mirror for Y-color image forming is executed after KVV signal shown in FIG. 7 (H) rises. The reason for this is that image forming start timing for each color is created with a basis of Y-color. In the course of this control for speed change, a frequency of YIDX signal is fluctuated.

In this example, YIDX signals shown in FIG. 6(A) after magnification correction control are outputted from index sensor 38Y shown in FIG. 4 to phase detection circuits 301 and 304. Y-CNT signal shown in FIG. 6(B) is outputted from counter circuit 43Y shown in FIG. 4 to calculating & comparing section 303.

In the example shown in FIG. 6(B), a counter cycle is set to output value N2 by Y-CNTPRD signal. YP-CLK signal shown in FIG. 6(C) is outputted from calculating & comparing section 303 to motor drive circuit 37Y. In the example shown in FIG. 6(C), period (t14-t11) is a clock cycle of YP-CLK signal after magnification correction control. In this example, Y-color image forming processing on a sheet fed out of tray 2 after waiting for stabilizing time Ty that is required for polygon mirror 42Y to be stabilized in terms of rotation is started, after a rotation speed of polygon motor 36Y is changed.

In this example, M-CNT signal shown in FIG. 6(E), for example, is outputted from counter circuit 43M shown in FIG. 4 to calculating & comparing section 306, after completion of Y-color image forming (or in the course of M-color image forming) on a sheet coming from tray 1. In FIG. 6(E), a counter cycle is set by M-CNTPRD signal to output value N2. Further, phase control amount ΔP is established by M-PHASE signal.

Phase detection circuit 305 detects phase difference A1 between rising time t1 of YP-CLK signal shown in FIG. 5(C), namely, a count base point of counter circuit 43Y for Y-color image forming, and rising time t2 of MP-CLK signal, namely, a count base point of counter circuit 43M for M-color image forming. Further, phase difference P1 between rising time t3 of YIDX signal shown in FIG. 5(A), and rising time t4 of MIDX signal shown in FIG. 5(D) is detected by phase detection circuit 304. In the mean time, the expression of E=0 holds for a rising edge of MP-CLK signal for M-color image forming before magnification correction control shown in FIG. 5(E).

In this case, calculating & comparing section 306 inputs counter output value N1 of MP-CLK signal before magnification correction control, counter output value N2 of MP-CLK signal after magnification correction control, phase control amount ΔP of polygon mirror 42M, and phase difference P1 between rising time of YIDX signal and rising time of MIDX signal, then, carries out an operation for the expression (1) explained earlier, and calculates phase difference P2 between YIDX signal after magnification correction control and MIDX signal for M-color image forming.

Then, MIDX signal after magnification correction control shown in FIG. 6(D) is outputted from index sensor 38M shown in FIG. 4 to phase detection circuit 304. M-CNT signal shown in FIG. 6(E) is outputted from counter circuit 43M to calculating & comparing section 306 both are shown in FIG. 4. In the example shown in FIG. 6(E) a counter cycle is set by M-CNTPRD signal to output value N2. MP-CLK signal shown in FIG. 6(F) is outputted from calculating & comparing section 306 to motor drive circuit 37M.

In this example, phase detection circuit 305 detects phase difference A2 between rising time t11 of YP-CLK signal shown in FIG. 6(C), namely, a count base point of counter circuit 43Y for Y-color image forming, and rising time t13 of MP-CLK signal, namely, a count base point of counter circuit 43M for M-color image forming.

In the example shown in FIG. 6(E), a clock of MP-CLK signal after magnification correction control rises at E2. In this case, calculating & comparing section 306 inputs phase difference A1 between a count base point of counter circuit 43Y for Y-color image forming before magnification correction control and a count base point of counter circuit 43M for M-color image forming, phase difference A2 between a count base point of counter circuit 43Y for Y-color image forming after magnification correction control and a count base point of counter circuit 43M for M, phase difference P1 between rising time of YIDX signal and rising time of MIDX signal, phase difference P2 between YIDX signal after magnification correction control calculated by phase control amount ΔP and MIDX signal for M-color image forming, and counter base point E1 for M-color image forming before magnification correction control, and carries out an operation for expression (2) to calculate count base point E2 of counter circuit 43M for the M-color image forming on a sheet coming from tray 2 after magnification correction control.

Based on this count base point E2, a rotation speed of polygon motor 36M is changed. Even in this example, M-color image forming processing is started on a sheet fed out of tray 2, after waiting for stabilizing time Tm during which a rotation of polygon mirror 42M is stabilized, from the moment of rotation speed changes for polygon motor 36M and of phase changes for polygon mirror 42M.

Incidentally, after completion of C-color image forming on a sheet coming from tray 1, rotation speed changes and phase changes for the polygon mirror for C-color image forming are controlled, in the same way as in the M-color image forming mentioned above. In this example, C-color image forming processing on a sheet fed out of tray 2 is started, after waiting for stabilizing time Tc during which a rotation of polygon mirror 42C is stabilized, from the moment of rotation speed changes for polygon motor 36C and of phase changes for polygon mirror 42C.

Further, after completion of K-color image forming on a sheet coming from tray 1, rotation speed changes and phase changes for the polygon mirror for K-color image forming are controlled. A frequency of KIDX signal is fluctuated in the course of controlling speed changes and phase changes. In this example, K-color image forming processing on a sheet fed out of tray 2 is started after waiting for stabilizing time Tk during which a rotation of polygon mirror 42K is stabilized, from the moment of rotation speed changes for polygon motor 36K and of phase changes for polygon mirror 42K.

In the example of image forming operations in the course of switching trays of this kind, there is a merit that Y-color image forming processing on a sheet fed out of tray 2 can be started before image processing on a sheet coming from tray 1 is totally completed.

In the color copier 100 in the first example, polygon mirrors 42Y-42K for respective colors are provided independently of others as stated above. When Y-color image forming serves as a basis under the assumption of the foregoing, calculating & comparing section 306 inputs phase difference A1 between a count base point of counter circuit 43Y before magnification correction control and a count base point of counter circuit 43M, phase difference A2 between a count base point of counter circuit 43Y after magnification correction control for Y-color image forming after magnification correction control and a count base point of counter circuit 43M, phase difference P1 between rising time of YIDX signal and rising time of MIDX signal, phase difference P2 between YIDX signal after magnification correction control calculated by phase control amount ΔP and MIDX signal for M-color image forming, and counter base point E1 before magnification correction control, and carries out an operation for expression (2) to calculate count base point E2 of counter circuit 43M for the M-color image forming on a sheet coming from tray 2 after magnification correction control.

It is therefore possible to shorten stabilizing time that stabilizes a rotation for each of polygon mirrors 42Y-42K, compared with a conventional method, because speed control and phase control can be executed simultaneously for polygon mirror 42M, polygon mirror 42C and further for polygon mirror 42K. Owing to this, a period of time required for magnification changes can be reduced sharply, and thereby, a decline of productivity of operations for magnification correction control can be restrained, which greatly contributes to continuous high speed processing for color images. In other words, even when executing operations for magnification correction control, the same productivity as in the occasion of executing no operations for magnification correction control can be secured, because image forming on a succeeding page can be started after waiting for only about a half of stabilizing time in a conventional method from a termination of image forming on the present page.

In this example, CPU 55 executes phase control under the basis of counter circuit 43Y of image forming unit 10Y for image forming of Y-color representing the first color for image forming. In this way, a period of stabilizing time can be reduced, and unwasteful control can be made possible.

In this example, when image writing units are arranged in the order of image writing unit 3Y for Y-color, image writing unit 3M for M-color, image writing unit 3C for C-color and image writing unit 3K for K-color, wherein the one that forms an image earliest comes first, the CPU 55 controls rotations and phases of respective polygon mirrors 42Y, 42M, 42C and 42K so that M-color image forming unit 3M may use a base point of a count cycle of polygon drive CLK generating counter circuit 43Y for polygon mirror 42Y of Y-color image writing unit 3Y as a basis, C-color image writing unit 3C may use a base point of a count cycle of polygon drive CLK generating counter circuit 43M for polygon mirror 42M of M-color image writing unit 3M as a basis, and K-color image writing unit 3K may use a base point of a count cycle of polygon drive CLK generating counter circuit 43C for polygon mirror 42C of C-color image writing unit 3C as a basis. By doing this, timing restriction can be restrained even when a scale of a machine is large, resulting in control wherein stabilizing time for stabilization in rotation of a polygon mirror is reduced.

Embodiment 2

FIG. 8 is a block diagram showing an example of configuration of color copier 200 as the second embodiment.

Unlike the first embodiment, this embodiment is equipped with a pseudo index signal generating circuit (hereinafter referred to as pseudo IDX generating circuit 12), and based on pseudo index signals (main scanning basis signals), control of rotation speed change and control of phase change both for a polygon mirror in each color image forming before and after magnification correction are executed simultaneously (third image forming apparatus). The pseudo index signal in this case (hereinafter referred to as MST-IDX signal) means a signal that is created through cycle establishment based on a cycle of main scanning basis signal (index signal which is called IDX signal hereafter) for drive control of a polygon mirror.

FIG. 8 is a block diagram showing an example of configuration of a control system of color copier 200. The color copier 200 shown in FIG. 8 has controller 15' that determines start timing of image forming on a prescribed surface of sheet P based on MST-IDX signal. To this controller 15', there are connected pseudo IDX generating circuit 12, image memory 13, image processing section 16, communication section 19, sheet feeding section 20, operation panel 48, image forming section 60' and image reading unit 102.

The controller 15' has therein ROM 53, RAM 54 for work and CPU 55'. The CPU 55' executes color image forming control on a prescribed surface of sheet P based on IDX signal whose cycle is fluctuated by rotation speed control and phase control of polygon mirror 42Y and on MST-IDX signal having a fixed cycle, when forming a dolor image on prescribed sheet P. In this example, the CPU 55' determines VTOP signal in color image forming processing from the front face to the rear face of sheet P and VTOP signal in color image forming processing in switching of sheet feeding from tray 1 to tray 2, based on single MST-IDX signal.

Image forming section 60' has image writing units 3Y, 3M, 3C and 3K respectively for Y-, M-, C- and K-color image forming, and inputs image data Dy, Dm, Dc and Dk for Y-, M-, C- and K-color image forming from image memory for Y-, M-, C- and K-color image forming to operate for forming an image on a prescribed surface of sheet P, based on IDX signal for Y-, M-, C- and K-color image forming and MST-IDX signal.

Further, the controller 15' is connected to pseudo IDX generating circuit 12 which creates MST-IDX signal that serves as a basis signal in the case of color image forming. Incidentally, YIDX signal or the like is a signal whose cycle is fluctuated by rotation speed control and phase control of polygon mirror 42Y, while, MST-IDX signal is one which is not affected by cycle fluctuation of a polygon mirror, to be set to a fixed cycle.

Based on a single MST-IDX signal, the controller 15' determines image forming start trigger (VTOP) signal in color image forming processing from the front face to the rear face of sheet P and VTOP signal in color image forming processing in the case of switching sheet feeding from tray 1 to tray 2. The controller 15' executes color image forming control on a prescribed surface of sheet P based on MST-IDX signal created by pseudo IDX generating circuit 12 and on IDX signals for Y-, M-, C- and K-color.

Owing to the foregoing, when forming a color image on each of the front face and the rear face of the sheet, for example, it is possible to execute accurately magnification correction control on the front face and the rear face of the sheet P, even when the sheet P shrinks after image forming on the front face. Further, when forming color images by switching sheet feeding from tray 1 to tray 2, it is possible to execute accurately magnification correction control on different sheets, even when a sheet type in tray 1 is different from that in tray 2. By using this MST-IDX signal, a period of time required for changing rotation speeds of a polygon mirror can be shortened, and the maximum productivity can be secured independently of a machine size.

Crystal oscillator 11 is connected to pseudo IDX generating circuit 12, and CLK1 signals are generated to be outputted to the pseudo IDX generating circuit 12 and to image writing units 3Y', 3M', 3C' and 3K' for Y-, M-, C- and K-color image forming. Incidentally, those having the names and symbols which are the same as those in the first embodiment have the same functions, thus, explanation for them will be omitted.

FIG. 9 is a block diagram showing an example of configuration of image writing unit 3Y' for Y-color image forming shown in FIG. 8 and its peripheral circuit. Image writing unit 3Y' for Y-color image forming shown in FIG. 9 is connected to crystal oscillator 11, pseudo IDX generating circuit 12 and CPU 55'. The image writing unit 3Y' is composed, for example, of crystal oscillator 31, pixel CLK generating circuit 32, horizontal synchronizing circuit 33, PWM signal generating circuit 34, laser (LD) drive circuit 35, polygon motor 36Y, motor drive circuit 37Y, index sensor 38Y, polygon drive CLK generating circuit 39, timing signal generator 40' and Y-VV (Valid) generating circuit 41Y.

In this example, CPU 55' of the controller 15' executes phase control on the basis of an output value of IDX counter circuit 401 establishing a cycle of MST-IDX signal. For example, the CPU 55' outputs Y-PHASE signal representing a phase control value to polygon drive CLK generating circuit 39Y, based on a sequence program. The Y-PHASE signal is established before the start of phase control of polygon mirror 42Y.

Further, the CPU 55' outputs equally an image leading edge signal (hereinafter referred to as VTOP signal) to timing signal generator 40' based on the sequence program. The VTOP signal is a signal for synchronizing conveyance timing for sheet P with image forming timing.

Under the arrangement mentioned above, a frequency of YP-CLK signal to be supplied to polygon motor 36Y for Y-color image forming can be controlled by CPU 55' independently for each of other image forming units 10M, 10C and 10K for M-, C- and K-color image forming.

Timing signal generator 40' for determining image forming start timing for Y-color image forming is connected to the aforesaid pseudo IDX generating circuit 12. The timing signal generator 40' is further connected to CPU 55', and selects MST-IDX signal outputted from the pseudo IDX generating circuit 12 based on VTOP signal outputted from CPU 55', when forming an image on the front face, for example, and counts the number of pulses of MST-IDX signal to determine an image forming start timing for Y-color image forming on the front face of the sheet based on the number of counted pulses. Concurrently with determination of the image forming start timing for Y-color image forming, image forming start signal (hereinafter referred to as STT signal) is outputted to Y-VV creating circuit 41Y.

Y-VV creating circuit 41Y counts the number of pulses of YIDX signal based on STT signal outputted from timing signal generator 40', and creates sub-scanning effective area signal (hereinafter referred to as YVV signal) for Y-color image forming on the front face of the sheet based on the number of counted pulses. YVV signal is outputted to image memory 83 for Y-color image forming.

Further, timing signal generator 40' selects MST-IDX signal outputted from pseudo IDX generating circuit 12 based on VTOP signal outputted from CPU 55' immediately before the start of image forming on the rear face, for example, and counts the number of pulses of the MST-IDX signal to determine image forming start timing for Y-color image forming on the rear face of the sheet based on the number of counted pulses. Concurrently with determination of the image forming start timing for Y-color image forming, STT signal (image forming start signal) is outputted to Y-VV creating circuit 41Y.

Y-VV creating circuit 41Y counts the number of pulses of YIDX signal based on STT signal outputted from timing signal generator 40', and creates YVV signal for Y-color image forming on the rear face of the sheet based on the number of counted pulses. YVV signal is outputted to image memory 83 for Y-color image forming.

Polygon drive CLK generating circuit 39Y is connected to crystal oscillator 11, pseudo IDX generating circuit 12 and to CPU 55', to operate to create polygon drive clock signal (YP-CLK signal) based on YIDX signal, CLK1 signal, MST-IDX signal and Y-CNTPRD signal.

The Y-CNTPRD signal is outputted to polygon drive CLK generating circuit 39Y from CPU 55' when forming images on the front and rear faces. The YIDX signal is outputted to polygon drive CLK generating circuit 39Y from index sensor 38Y. The CLK1 signal is outputted to polygon drive CLK generating circuit 39Y from crystal oscillator 11. The MST-IDX signal is outputted to polygon drive CLK generating circuit 39Y from pseudo IDX generating circuit 12. An example of internal configuration of polygon drive CLK generating circuit 39Y will be explained, referring to FIG. 10. In the mean time, since other image writing units 3M', 3C' and 3K' for color image forming also have the same configurations and functions, explanation for them is omitted.

Although crystal oscillator 31, pixel CLK generating circuit 32, horizontal synchronizing circuit 33, PWM signal generating circuit 34, polygon drive CLK generating circuit 39Y, timing generator 40' and Y-VV generating circuit 41Y are included in the image writing unit 3Y' in this example, the invention is not limited to this, and these circuit elements may also be included in image processing section 16 or in controller 15'.

With the controller 15' constituted in the aforesaid manner, control for rotation speed change and phase change of polygon mirror 42Y is executed after completion of each color image forming based on MST-IDX signal established to prescribed cycle. Due to this, it is possible to execute control of rotation speed change and phase change of a polygon mirror for that color image forming. Incidentally, those having the names and symbols which are the same as those in the first embodiment have the same functions, thus, explanation for them will be omitted.

FIG. 10 is a block diagram showing an example of configuration of a polygon mirror drive system including a pseudo IDX generating circuit.

In this example, pseudo IDX generating circuit 12 is provided, and MST-IDX signals are supplied to units 3Y'-3K' respectively for Y, M, C and K to control polygon mirrors 42Y-42K, which is different from the polygon mirror drive system shown in FIG. 4.

Pseudo IDX generating circuit 12 shown in FIG. 10 is composed of IDX counter circuit 401 and comparator 402. The IDX counter circuit 401 is connected to crystal oscillator 11 and to CPU 55', and counts CLK1 signals based on I-CNTPRD signal to output I-CNT signal (output value) to the comparator 402. The I-CNTPRD signal is one to set a cycle of MST-IDX signal, and it is set to IDX counter circuit 401 from the CPU 55'.

The comparator 402 compares I-CNT signal outputted from IDX counter circuit 401 with W-MASTIDX signal for determining a period of a high (H) level of MST-IDX signal outputted from CPU 55', and outputs MST-IDX signal. The MST-IDX signals are outputted to units 3Y'-3K' respectively for Y, M, C and K. Y unit 3Y' is composed of counter circuit 43Y, polygon drive CLK generating circuit 39Y, motor drive circuit 37Y, polygon motor 36Y and index sensor 38Y.

Counter circuit 43Y determines output timing of YP-CLK signal for driving polygon motor 36Y (polygon mirror 42Y). When MST-IDX signal is a basis in the case of color image forming, CPU 55' controls output timing of YP-CLK signal for the next page based on output value Y-CNT signal of counter circuit 43Y, a phase difference between MST-IDX signal and YIDX signal, a phase difference between a base point of count cycle of I-ORG signal by counter circuit 401 and a base point of a count cycle of Y-ORG signal by counter circuit 43Y and on Y-PHASE signal showing an amount of phase control of polygon mirror 42Y.

The CPU 55' controls a count cycle-established independently of polygon mirrors 42Y-42K shown in FIG. 1 through units 3Y'-3K' respectively for Y, M, C and K, based on MST=IDX signal. In the case of driving polygon motor 36Y based on YP-CLK signal, the CPU 55' controls units 3Y'-3K' respectively for Y, M, C and K so that count cycles may be the same each other concerning image forming on the same page, and establishes count cycles individually for units 3Y'-3K' respectively for Y, M, C and K to execute speed control.

Further, the CPU 55' controls calculating & comparing section 303 to calculate an amount of phase control based on a base point of a count cycle of I-ORG signal by IDX counter circuit 401, a base point of a count cycle by counter circuit 43Y on which the aforesaid speed control has been completed, and on an amount of phase control (an amount of adjustment for phase difference deviation), to execute phase control for controlling a phase of YP-CLK signal based on this amount of phase adjustment.

Polygon drive CLK generating circuit 39Y is connected to counter circuit 43Y to generate YP-CLK signal, referring to an output value of the counter circuit 43Y. The polygon drive CLK generating circuit 39Y has phase detecting circuit 301 for indexing, phase detecting circuit 302 for a counter and calculating & comparing section 303.

Phase difference PY between MST-IDX signal and YIDX signal is detected by the phase detecting circuit 301. Phase difference AY between a base point of a count cycle of Y-ORG signal by counter circuit 43Y for Y-color image forming and a base point of a count cycle of Y-ORG is detected by the phase detecting circuit 302. The phase detecting circuits 301 and 302 are connected to calculating & comparing section 303 constituting an example of an operation section that carries out operation for phase difference PY, phase difference AY and Y-PHASE to calculate an amount of phase adjustment. In this example, an amount of phase adjustment equaling zero is outputted because of Y-color image forming basis. Incidentally, an explanation of internal configurations of units 3M'-3K' respectively for M, C and K will be omitted here, because each of them employs the same configuration and same function as in unit 3Y' for Y.

Each of FIGS. 11(A)-11(E) is a time chart showing operation examples (in MST-IDX basis) before magnification correction control in image forming section 60'. In this example, there is shown the state before magnification correction control (CNTPRD I=CNTPRD M=N1) under the occasion where MST-IDX signal is a basis.

MST-IDX signals shown in FIG. 11(A) are outputted from comparator 402 shown in FIG. 10 before magnification correction control to phase detecting circuit 301 of unit 3Y' for Y and to phase detecting circuits of other unillustrated units for M, C and K. I-CNT signal shown in FIG. 11(B) is outputted to comparator 402 from IDX counter circuit 401 of pseudo IDX generating circuit 12 shown in FIG. 10. In FIG. 11(B), a counter cycle is set to output value N1 by I-CNTPRD signal.

YIDX signal shown in FIG. 11(C) is outputted from index sensor 38Y shown in FIG. 10 before magnification correction control to phase detecting circuit 301. Y-CNT signal shown in FIG. 11(D) is outputted from counter circuit 43Y shown in FIG. 10 to calculating & comparing section 303. In FIG. 11(D), a counter cycle is set to output value N1 by Y-CNTPRD signal.

YP-CLK signal shown in FIG. 11(E) is outputted from calculating & comparing section 303 shown in FIG. 10 to motor drive circuit 37Y. In FIG. 11(C), a period (t5-t1) is a clock-cycle of YP-CLK signal before magnification correction control. YP-CLK signal is reversed from high level to low level at the point in time when counter circuit 43Y counts N1/2.

In this example, when P1' represents a count base point of IDX counter circuit 401 shown in FIG. 11(A), namely, a phase difference between rising time t21 of MST-IDX signal and rising time t23 of YIDX signal shown in FIG. 11(C), phase detecting circuit 301 detects this phase difference P1'.

When A1' represents a phase difference between rising time t21 of MST-IDX signal shown in FIG. 11(A), namely, a count base point of IDX counter circuit 401 and rising time t22 of YP-CLK signal shown in FIG. 11(D), namely, a count base point of counter circuit 43Y for Y-color image forming, phase detecting circuit 302 detects this phase difference A1'. Incidentally, a counter base point for Y-color image forming before magnification correction control shown in FIG. 11(D) is made to be E1' which equals zero in this example.

Each of FIGS. 12(A)-12(E) is a time chart showing operation examples (in MST-IDX basis) before magnification correction control in image forming section 60'. In this example, there is shown the state after magnification correction control (CNTPRD I=CNTPRD M=N2) under the occasion where MST-IDX signal is a basis.

MST-IDX signals shown in FIG. 12(A) are outputted from comparator 402 shown in FIG. 10 after magnification correction control to phase detecting circuit 301 of unit 3Y' for Y and to phase detecting circuits of other unillustrated units for M, C and K. I-CNT signal shown in FIG. 12(B) is outputted to comparator 402 from IDX counter circuit 401 of pseudo IDX generating circuit 12 shown in FIG. 10. In FIG. 12(B), a counter cycle is set to output value N2 by I-CNTPRD signal.

YIDX signal shown in FIG. 12(C) is outputted from index sensor 38Y shown in FIG. 10 after magnification correction control to phase detecting circuit 301 and phase detecting circuit 304. Y-CNT signal shown in FIG. 12(D) is outputted from counter circuit 43Y shown in FIG. 10 to calculating & comparing section 303. In FIG. 12(D), a counter cycle is set to output value N2 by Y-CNTPRD signal. YP-CLK signal shown in FIG. 12(E) is outputted from calculating & comparing section 303 shown in FIG. 10 to motor drive circuit 37Y.

In this example, when A2' represents a phase difference between a count base point (time t31) of IDX counter circuit 401 shown in FIG. 12(B) and a count base point (time t32) of counter circuit 43Y for Y-color image forming, phase detecting circuit 302 detects this phase difference A2'.

For example, when N1 represents a counter output value of YP-CLK signal before magnification correction control, N2 represents a counter output value of YP-CLK signal after magnification correction, P1' represents a phase difference between rising time t21 of MST-IDX signal shown in FIG. 11(A) and rising time t23 of YIDX signal shown in FIG. 11(C), ΔP represents an amount of phase control of polygon mirror 42Y and P2' represents a phase difference between MST-IDX signal after magnification correction control and YIDX signal for Y-color image forming, the calculating & comparing section 303 carries out operation for the following expression (3).

$$P2'=(P1'+\Delta P)\times N2/N1 \quad (3)$$

In this case, E2 represents a counter base point for Y-color image forming after magnification correction control shown in FIG. 12(E). Together with calculation of phase difference P2', the calculating & comparing section 303 carries out operation for the following expression (4), when A1' represents a phase difference between rising time t21 of MST-IDX signal shown in FIG. 11(A), namely, a count base point of IDX counter circuit 401 and rising time t22 of YP-CLK signal shown in FIG. 11(D), namely, a count base point of counter circuit 43Y for Y-color image forming, A2' represents a phase difference between a count base point of IDX counter circuit 401 shown in FIG. 12(B) (time t31) and a count base point of counter circuit 43Y for Y-color image forming (time t32), E1' represents a counter base point for Y-color image forming before magnification correction control, and E2' represents a count base point of counter circuit 43Y for the Y-color image forming on the next page after magnification correction control.

$$E2'=(A2'-A1')+(P2'-P1')+E1' \quad (4)$$

Incidentally, M unit 3M', C unit 3C' and K unit 3K' employ the same configuration as that of Y unit 3Y'. CLK1 signals are supplied commonly to counter circuits 43Y, 43M, 43C and 43K respectively for Y-color, M-color, C-color and K-color image forming. Since the same operation is carried out also between IDX counter circuit 401 and counter circuit 43M, 43C or 43K for other color image forming, an explanation will be omitted.

As stated above, it is possible to determine the counter value to be set, by comparing phases between IDX counter circuit 401 and counter circuits 43Y, 43M, 43C and 43K respectively for generating YP-CLK signal, MP-CLK signal, CP-CLK signal and KP-CLK signal, regarding positions of edges for rising and falling of YP-CLK signal, MP-CLK signal, CP-CLK signal and KP-CLK signal. Therefore, CPU 55' can execute speed control and phase control simultaneously even when a single MST-IDX signal is made to be a basis. Accordingly, even when magnification correction control is involved, a decline of its productivity can be restrained.

Next, operations of color copier 200 relating to the second example will be explained. Each of FIGS. 13(A)-13(M) is a time chart showing operation examples (MST-IDX signal basis) before and after magnification correction control of the color copier 200.

In this example, what is given as an example is an occasion wherein a single MST-IDX signal is outputted from pseudo IDX generating circuit 12 shown in FIG. 10, and speed control and phase control for polygon mirror 42Y and others respectively for Y-color, M-color, C-color and K-color are executed, under the basis of MST-IDX signal that is fixed to a prescribed cycle (frequency).

In this example, MST-IDX signal shown in FIG. 13(L) is used as base index signal in the case of phase adjusting for a polygon.

Further, with respect to YVV-, MVV-, CVV- and KVV-start timing respectively for Y-, M-, C- and K-color, there is introduced, as an example, the occasion wherein the start timing is determined by counting the number of pulses by using MST-IDX signal as a count source, during period TX from rising time of VTOP signal for image forming on a front face of tray 1 to the time for rewriting the established value for the front face of tray 1 to established value for the front face of tray 2. Incidentally, regarding the established value of frequency dividing for MST-IDX, the established value for the front face of tray 1 shown in FIG. 13(M) together with an unillustrated print start is stored in RAM 54 or the like. After that, an established value for a front face of tray 1, an established value for a front face of tray 2, an established value for a rear face of tray 1 and an established value for a rear face of tray 2 are set in order.

In this example, frequency dividing setting change timing of MST-IDX signal is determined after the KVV signal for the last color (K-color) has risen and before the start of phase change of the first image forming color (Y). Further, there is executed sheet feeding control for feeding out sheet P2 to an image forming system from tray 2, so that VTOP signal for image forming on a front face of tray 2 may be detected after completion of phase change control of the first image forming color (Y) for sheet P1 coming from tray 1.

Example of Control for Front Face Imaging with Tray 1

VTOP signal for front face imaging with tray 1 shown in FIG. 13(A) rises at time T11 when a leading edge of sheet P1 fed out of tray 1 is detected. After that, VTOP signal rises, and then, the number of pulses of MST-IDX signal is counted by an unillustrated MST-IDX counter, and at time T2 that is synchronized with a pulse count output of the first MST-IDX signal, YVV start timing shown in FIG. 13(B) rises. After that, the YVV start timing falls at time T13 that is synchronized with the second pulse count output of the MST-IDX signal.

The number of pulses of YIDX signals shown in FIG. 13 (D) is counted by an unillustrated YIDX counter after generation of YVV start timing, and at time T14 that is synchronized with a pulse count output of the first YIDX signal, YVV signal for front face of tray 1 shown in FIG. 13 (C) rises. An "H" level period of YVV signal is determined by counting the actual YIDX signal. During this "H" level period of the YVV signal, Y-color image forming processing on the front face of sheet P1 coming from tray 1 is carried out. After KVV signal for K-color has been changed from "L" level to "H" level after completion of the Y-color image forming processing, frequency dividing (ratio) setting of a counter for MST-IDX is changed, and then, control of a rotation speed and a phase for polygon mirror 42Y for Y-color image forming is executed. In this example, CPU 55' executes control of a rotation speed and a phase for polygon mirror 42Y for Y-color based on MST-IDX signal.

For example, in the calculating & comparing section 303 of Y unit 3Y' for which Y-CNTPRED signal and Y-PHASE signal are set from CPU 55', there are carried out operations for counter output value N1 of YP-CLK signal before magnification correction control, counter output value N2 of YP-CLK signal after magnification correction control, phase difference P1' between a count base point of IDX counter circuit 401 shown in FIG. 11(A), namely, rising time t21 of MST-IDX signal and rising time t23 of YIDX signal shown in FIG. 11(C) and phase difference P2' between MST-IDX signal after magnification correction control based on the expression (3) by inputting phase control amount ΔP of polygon mirror 42Y and YIDX signal for Y-color image forming.

Together with the foregoing, the calculating & comparing section 303 carries out an operation for count base point E2' of counter circuit 43Y for the Y-color image forming for the next tray (next page) after magnification correction control, based on the expression (4) explained earlier, by inputting phase difference A1' between rising time t21 of MST-IDX signal shown in FIG. 11(A), namely, a count base point of IDX counter circuit 401 and rising time t22 of YP-CLK signal shown in FIG. 11(D), namely, a count base point of counter circuit 43Y for Y-color image forming, phase difference A2' between a count base point (time t31) of IDX counter circuit 401 shown in FIG. 12(B) and a count base point (time t32) of counter circuit 43Y for Y-color image forming, and counter base point E1' for Y-color image forming before magnification correction control. In this example, Y-color image forming on a sheet fed out of tray 2 is started after waiting for stabilizing time Ty' during which the rotation of polygon mirror 42Y is stabilized, after the change of rotation speed of polygon motor 36Y.

With respect to MVV start timing shown in FIG. 13(E), the number of pulses of MST-IDX signal is counted by an unillustrated MST-IDX counter even after generation of YVV start timing, and the MVV start timing rises at a time synchronized with the fourth pulse count output of the MST-IDX signal, and it falls at a time synchronized with the fifth pulse count output, in this example. With respect to MVV signal for the front face of tray 1 shown in FIG. 13(F), the number of pulses of MIDX signal is counted by an unillustrated MIDX counter after generation of MVV start timing, and the MVV signal rises at a time synchronized with a pulse count output of the first MIDX signal. A period of "H" level of the MVV signal is determined by counting the actual number of pulses of MIDX signal. During this "H" level period of the MVV signal, M-color image forming processing is carried out on the front face of sheet P1 coming from tray 1. After completion of this M-color image forming processing, control of rotation speed and phase of polygon mirror 42M for M-color image forming is carried out. In the mean time, since operations in M unit 3M' are the same as those in Y unit 3Y', its explanation will be omitted. In this example, and it falls at a time synchronized with the fifth pulse count output, in this example, M-color image forming on a sheet fed out of tray 2 is started after waiting for stabilizing time Tm' during which the rotation of polygon mirror 42M is stabilized, after the change of rotation speed of polygon motor 36M.

With respect to CVV start timing shown in FIG. 13(G), the number of pulses of MST-IDX' signal is counted by an unillustrated MST-IDX counter even after generation of YVV start timing and MVV start timing, and the CW start timing rises at a time synchronized with the seventh pulse count output of the MST-IDX signal, and it falls at a time synchronized with the eighth pulse count output, in this example. With respect to CVV signal for the front face of tray 1 shown in FIG. 13(H), the number of pulses of CIDX signal is counted by an unillustrated CIDX counter after generation of CVV start timing, and the CVV signal rises at a time synchronized with a pulse count output of the first CIDX signal.

A period of "H" level of the CVV signal is determined by counting the actual number of pulses of CIDX signal. During this "H" level period of the CVV signal, C-color image forming processing is carried out on the front face of sheet P1 coming from tray 1. After completion of this C-color image forming processing, control of rotation speed and phase of polygon mirror 42C for C-color image forming is carried out. In the mean time, since operations in C unit 3C' are the same as those in Y unit 3Y', its explanation will be omitted. In this example, C-color image forming on a sheet fed out of tray 2 is started after waiting for stabilizing time Tc' during which the rotation of polygon mirror 42C is stabilized, after the change of rotation speed of polygon motor 36C.

With respect to KVV start timing shown in FIG. 13(I), the number of pulses of MST-IDX signal is counted by an unillustrated MST-IDX counter even after generation of YVV start timing, MVV start timing and CVV start timing, and the KVV start timing rises at a time synchronized with the tenth pulse count output of the MST-IDX signal, and it falls at a time synchronized with the eleventh pulse count output, in this example. With respect to KVV signal for the front face of tray 1 shown in FIG. 13(J), the number of pulses of KIDX signal is counted by an unillustrated KIDX counter after generation of KVV start timing, and the KVV signal rises at a time synchronized with a pulse count output of the first KIDX signal. A period of "H" level of the KVV signal is determined by counting the actual number of pulses of KIDX signal. During this "H" level period of the KVV signal, K-color image forming processing is carried out on the front face of sheet P1 coming from tray 1.

In this example, after KVV signal for the last color (K-color) rises, an established value of frequency dividing for MST-IDX shown in. FIG. 13(M) is rewritten from the established value for the front face of tray 1 to the established value for the front face of tray 2. This switching of the established value is executed before phase change control for in rotation speed and phase control for polygon mirror 42Y for Y-color image forming, and with a trigger of rising of KVV signal that rises in synchronization with KIDX signal shown in FIG. 13(K). In this example, K-color image forming on a sheet fed out of tray 2 is started after waiting for stabilizing time Tk' during which the rotation of polygon mirror 42Y is stabilized, after the change of rotation speed of polygon motor 36Y.

Example of Control for Front Face Imaging with Tray 2

Further, after Y-color image forming on the front face of sheet P1 coming from tray 1 has been completed, and after control of phase change for polygon mirror 42Y for Y-color image forming has been completed, sheet P2 is fed out to an image forming system from tray 2 through sheet feeding control by CPU 55'. A leading edge of the sheet P2 fed out of tray 2 is detected at time T16 shown in FIG. 13(A), and VTOP signal for the front face of tray 2 rises.

After rising of this VTOP signal, the number of pulses of MST-IDX signal is counted by an unillustrated MST-IDX counter, and YVV start timing signal for the front face of tray 2 shown in FIG. 13(B) rises at time T17 that is synchronized with pulse count output of the first MST-IDX signal. After that, YVV start timing signal falls at time T18 that is synchronized with the second pulse count output of MST-IDX signal.

The number of pulses of YIDX signals shown in FIG. 13 (D) is counted by an unillustrated YIDX counter after generation of YVV start timing, and at time T19 that is synchronized with a pulse count output of the first YIDX signal, YVV signal for front face of tray 2 shown in FIG. 13 (C) rises. In this example, K-color image forming processing is terminated after YVV signal for the front face of tray 2 rises, and then, control of rotation speed and phase of polygon mirror 42K for K-color image forming is executed. In the mean time, since operations in K unit 3K' are the same as those in Y unit 3Y', its explanation will be omitted.

The number of pulses of YIDX signals shown in FIG. 13 (D) is counted by an unillustrated YIDX counter after generation of YVV start timing, and at time T19 that is synchronized with a pulse count output of the first YIDX signal, YVV signal for front face of tray 2 shown in FIG. 13 (C) rises. A period of "H" level of the YVV signal is determined by counting the actual number of pulses of YIDX signal. During this "H" level period of the YVV signal, Y-color image forming processing is carried out on the front face of sheet P2 coming from tray 2. After completion of this Y-color image forming processing, control of rotation speed and phase of polygon mirror 42Y for Y-color image forming is carried out. In the mean time, since operations for the front face of tray 2 of Y unit 3Y' are the same as those for the front face of tray 1 of Y unit 3Y', its explanation will be omitted.

In the color copier 200 relating to the second example, pseudo IDX generating circuit 12 is provided, and control of a rotation speed change and control of a phase change for the polygon mirror in each color image forming before and after magnification correction are executed simultaneously, based on MST-IDX signal, as stated above. Under this assumption, when Y-color image forming is a basis, phase difference P2' between MST-IDX signal after magnification-correction control and YIDX signal for Y-color image forming is calculated based on expression (3) in calculating & comparing section 303 of unit 3Y' for Y where Y-CNTPRED signal and Y-PHASE signal are set from CPU 55'. Together with this, the calculating & comparing section 303 of Y unit 3Y' is caused to calculate count base point E2' of counter circuit 43Y for the Y-color image forming after magnification correction control based on the expression (4) explained earlier. Calculation is carried out in the same way as in the foregoing even for each of units 3M'-3K' respectively for M-K.

Therefore, compared with a conventional method, it is possible to shorten a period of stabilizing time during which a rotation for each of polygon mirrors 42Y-42K is stabilized, because speed control and phase control can be executed simultaneously for polygon mirror 42Y, polygon mirror 42M, polygon mirror 42C and polygon mirror 42K. Owing to this, a decline of productivity in the case of magnification correction control operations can be restrained, which greatly contributes to continuous high speed processing for color images. In other words, image forming for next tray 2 can be started after waiting for the stabilizing time that is about a half of that in the conventional method, after completion of image forming for the tray 1, thus, the same productivity as that in the occasion of no execution of operations for magnification correction control can be secured even when operations for magnification correction control are executed.

Embodiment 3

FIG. 14 is a block diagram showing an example of configuration of a control system in color copier 300 relating to the third embodiment.

The color copier 300 shown in FIG. 14 is one to execute color image forming control on a prescribed surface of sheet P based on two pseudo main scanning basis signals. The color copier 300 is equipped with pseudo IDX generating circuit 12', image memory 13, controller 15", image processing section 16, communication section 19, sheet feeding section 20, operation panel 48, image forming section 60" and image reading unit 102 which are all connected to controller 15".

The pseudo IDX generating circuit 12' is caused to generate first and second MST-IDX signals each of which is a basis signal in the case of forming color images on which a prescribed cycle can be set freely. The pseudo IDX generating circuit 12' generates, for example, the first MST-IDX1 signal having the first cycle and the second MST-IDX2 signal having the second cycle that is shorter than the first cycle. This MST-IDX1 signal is used to form images on the front face of a sheet and the MST-IDX2 signal is used to form images on the rear face of a sheet.

The controller 15" has ROM 53, RAM 54 and CPU 55". In this example, the pseudo IDX generating circuit 12' generates MST-IDX1 and MST-IDX2 signals, and CPU 55" determines image forming start timing on the other surface of sheet P1 or on a surface on one side of the next sheet P2, based on MST-IDX1 signal and MST-IDX2 signal, then, it further establishes cycles of MST-IDX1 signal and MST-IDX2 signal, and executes simultaneously rotation speed change control and phase change control in each color image forming before and after magnification correction, based on MST-IDX1 signal or MST-IDX2 signal.

The image forming section 60" is connected to the controller 15". The image forming section 60" has image writing units 3Y", 3M", 3C" and 3K" respectively for Y-color, M-color, C-color and K-color, and it inputs image data Dy, Dm, Dc and Dk for Y-color, M-color, C-color and K-color from image memory 13 for Y-color, M-color, C-color and K-color, and operates to form images on the prescribed surface of sheet P based on MST-IDX1 or MST-IDX signal, selection control signals SS1 and SS2, CNTPRD signal and PHASE signal. Incidentally, those having the names and symbols which are the same as those in the first and second embodiments have the same functions, thus, explanation for them will be omitted.

FIG. 15 is a block diagram showing an example of configuration of image writing unit 3Y" for Y-color image forming extracted from FIG. 14 and its peripheral circuit. The image writing unit 3Y" for Y-color image forming shown in FIG. 15 is connected to crystal oscillator 11, pseudo IDX generating circuit 12' and CPU 55".

What is different from the second embodiment is that the pseudo IDX generating circuit 12' generates MST-IDX1 signal and MST-IDX2 signal based on CLK1 signal. The CLK1 signal is outputted from crystal oscillator 11 to the pseudo IDX generating circuit 12' and polygon drive CLK generating circuit 39Y.

In this example, CPU 55" establishes cycles for MST-IDX1 signal and MST-IDX2 signal, and executes phase control with a basis of an output value of an unillustrated IDX counter circuit. For example, the polygon drive CLK generating circuit 39Y is equipped with an unillustrated selector which selects MST-IDX1 signal or MST-IDX2 signal based on selection control signal SS1.

The CPU 55" outputs the selection control signal SS1 to the polygon drive CLK generating circuit 39Y based on a sequence program. The selection control signal SS1 is established before the start of plane phase control of polygon mirror 42Y. In the same way, the CPU 55" outputs selection control signal SS2 to timing signal generator 40" based on the sequence program. The selection control signal SS2 is generated based on a control command that indicates image forming on the rear face or tray switching, and is established before an image tip signal (hereinafter referred to as VTOP signal) rises. The VTOP signal is a signal for synchronizing conveyance timing with image forming timing for sheet P.

In this example, each of selection control signals SS1 and SS2 shows respectively selection of the front face or tray 1, for example, at a low level (hereinafter referred to as "L" level), and selection of the rear face or tray 2 at a high level (hereinafter referred to as "H" level). By doing this, a frequency of YP-CLK signal to be supplied to polygon motor 36 for Y-color can be controlled by CPU 55" independently of other image forming units 10M, 10C and 10K respectively for M-color, C-color and K-color.

The aforesaid pseudo IDX generating circuit 12 is connected with timing signal generator 40" that determines image forming start timing for Y-color image forming. When forming images on the front face, the timing signal generator 40" selects MST-IDX1 signal or MST-IDX2 signal outputted from pseudo IDX generating circuit 12', based on VTOP signal and selection control signal SS2 outputted from CPU 55", and counts the number of pulses of the MST-IDX1 signal or MST-IDX2 signal to determine image forming start timing for Y-color image forming on the front face of the sheet, based on the number of counted pulses. Concurrently with the determination of the image forming start timing for Y-color image forming, image forming start signal (hereinafter referred to as STT signal) is outputted to Y-VV creating circuit 41Y.

The Y-VV creating circuit 41Y counts the number of pulses of YIDX signal based on STT signal outputted from timing signal generator 40", and creates sub-scanning effective are signal (hereinafter referred to as YVV signal) based on the number of counted pulses. The YVV signal is outputted to image memory 83 for Y-color image forming.

Further, the timing signal generator 40" selects the MST-IDX1 signal or MST-IDX2 signal outputted from pseudo IDX generating circuit 12', based on, for example, VTOP signal and selection control signal SS2 outputted from CPU 55" immediately before image forming on the rear face, and counts the number of pulses of MST-IDX1 signal or MST-IDX2 signal to determine image forming start timing for Y-color image forming on the rear face of the sheet, based on the number of counted pulses. Concurrently with the determination of the image forming start timing for Y-color image forming, STT signal (image forming start signal) is outputted to Y-VV creating circuit 41Y.

The Y-VV creating circuit 41Y counts the number of pulses of YIDX signal based on STT signal outputted from timing signal generator 40", and creates YVV signal for Y-color image forming on the rear face of the sheet based on the number of counted pulses. The YVV signal is outputted to image memory 83 for Y-color image forming.

Further, polygon drive CLK generating circuit 39Y" is connected to crystal oscillator 11, pseudo IDX generating circuit 12 and CPU 55', and it operates to creates polygon drive clock signal (YP-CLK signal) for Y-color image forming, based on YIDX signal, CLK1 signal, MST-IDX signal and Y-CNTPRD signal.

When forming images on both the front face and the rear face, Y-CNTPRD signal is outputted from CPU 55" to polygon drive CLK generating circuit 39Y. YIDX signal is outputted from index sensor 38Y to polygon drive CLK generating circuit 39Y. MST-IDX1 signal and MST-IDX2 signal are outputted from pseudo IDX generating circuit 12 to polygon drive CLK generating circuit 39Y". FIG. 10 is to be consulted for an example of internal configuration of the polygon drive CLK generating circuit 39Y". In the mean time, since each of other image writing units 3M', 3C' and 3K' has also the configuration and function which are the same as those in the foregoing, descriptions for them will be omitted.

In this example, an explanation has been given by including crystal oscillator 31, pixel CLK generating circuit 32, horizontal synchronizing circuit 33, PWM signal generating circuit 34, polygon drive CLK generating circuit 39Y", timing generator 40" and Y-VV generating circuit 41Y in the image writing unit 3Y". However, the invention is not limited to this, and these circuit elements may also be included in image processing section 16 or in controller 15" for the configuration.

Next, an example operations of color copier 300 will be explained. Each of FIGS. 16(A)-16(O) is a time chart showing operation examples before and after magnification correction control of the color copier 300. In this example, when switching between the front face and the rear face of the sheet for image forming, image forming start timing for the rear face of sheet P is determined based on MST-IDX1 signal and MST-IDX2 signal, and rotation speed control and phase control for polygon mirrors 42Y-42K for respective colors are executed simultaneously. In that case, rising timing of YP-CLK signal on the rear face of the sheet is determined.

In FIG. 16(O), T1 shows a period during which the start timing for each of YVV signal, MVV signal and CVV signal in the case of image forming on the front face is determined with MST-IDX1 signal serving as a count source. Incidentally, a width (W width) of the sub-scanning effective area of each of YVV signal, MVV signal and CVV signal in the case of image forming on the front face is determined by using actual YIDX signal, MIDX signal and CIDX signal obtained from index sensor 38Y. As a basis IDX signal in the case of controlling speed and phase of polygon mirror 42Y, MST-IDX1 signal or MST-IDX2 signal is used, one after the other.

Further, in FIG. 16(O), T" shows a period of time to determine start timing of each of YVV signal, MVV signal and Cvv signal in the case of forming images on the rear face, with MST-IDX2 signal serving as a count source. In the mean time, a sub-scanning effective area width (W width) of each of YVV signal, MVV signal and CVV signal in the case of forming images on the rear face is determined by using actual YIDX signal, MIDX signal and CIDX signal obtained from index sensor 38Y. MST-IDX2 signal is used as a basis IDX signal in the case of controlling speed and phase of polygon mirror 42Y.

In this example, color toner images formed on intermediate transfer belt 6 are conveyed in the sub-scanning direction in the order of K-color, C-color, M-color and Y-color. Therefore, in the image forming units 10Y, 10M, 10C and 10K, images are formed in the order of Y-color, M-color, C-color and K-color. In each of image writing units 3Y", 3M", 3C" and 3K", speed control and phase control are executed under the basis of pseudo MST-IDX1 signal or MST-IDX2 signal.

With respect to STT signal (image forming start signal) for Y-color image forming in the case of forming images on the front face, start timing for YVV signal is determined by inputting those latched by MST-IDX1 signal in Y-VV generating circuit 41Y of image writing unit 3Y", and by counting them. YVV signal is created by counting YIDX signal of image writing unit 3Y", with this STT signal (image forming start signal) for Y-color image forming that serves as a basis. A description will be given as follows by dividing into three occasions including the case of image forming on the front face, the case of switching between the front face and the rear face and the case of image forming on the rear face.

Image Forming on the Front Face

Under these operation conditions, VTOP signal (image tip signal) showing image forming on the front face in FIG. 16(A) rises in synchronization with MST-IDX1 signal at time t1 shown in FIG. 16(N), and these VTOP signals are outputted from CPU 55" to timing signal generators 40" for image forming of respective colors, Y-VV generating circuit 41Y, M-VV generating circuit 41M, C-VV generating circuit 41C and K-VV generating circuit 41K.

After that, the number of pulses of MST-IDX1 signal shown in FIG. 16(N) is counted in the timing signal generator 40", and STT signal for Y-color image forming (hereinafter referred to as SST-Y signal) rises at time t2 shown in FIG. 16(D). This STT-Y signal is an image forming start signal that indicates the start of image forming on the front face for image forming unit 10Y for Y-color image forming. This STT-Y signal falls at time t3, and further, the number of pulses of MST-IDX1 signal is counted based on STT-Y signal in Y=VV generating circuit 41Y which starts YVV signal at time t4 shown in FIG. 16(E).

For example, in Y-VV generating circuit 41Y, MST-IDX1 signal outputted from pseudo IDX generating circuit 12' is selected based on VTOP signal outputted from CPU 55" and on "L" level selection control signal SS2, and the number of pulses of YIDX signal is counted based on VTOP signal to create YVV signal for Y-color image forming on the front face (sub-scanning effective area signal for Y-color image forming) based on the number of counted pulses.

YVV signal shown in FIG. 16(E) is outputted to image memory 83 for Y-color image forming. In this case, horizontal synchronizing circuit 33 shown in FIG. 15 operates to detect horizontal synchronizing signal Sh based on YIDX signal to output to PWM signal generating circuit 34. YIDX signal shown in FIG. 16(F) is outputted from index sensor 38Y for Y-color image forming to horizontal synchronizing circuit 33 and is outputted to polygon drive CLK generating circuit 39Y".

The PWM signal generating circuit 34 operates to input horizontal synchronizing signal Sh and image data Dy for Y-color image forming, and to modulate the image data Dy in terms of pulse width to output laser drive signal Sy for Y-color image forming to LD drive circuit 35. The LD drive circuit 35 drives laser diode based on the laser drive signal Sy so that laser beam LY for Y-color image forming having prescribed intensity is generated to radiate toward polygon mirror 42Y.

Further, the polygon drive CLK generating circuit 39Y" creates YP-CLK signal based on YIDX signal, CLK1 signal, MST-IDX1 signal, MST-IDX2 signal, Y-CNTPRD signal and "L" level selection control signal SS1.

Motor drive circuit 37Y drives polygon motor 36Y based on YP-CLK signal. The polygon motor 36Y operates to rotate polygon mirror 42Y. A laser diode connected to the motor drive circuit 37Y radiates laser beam LY, and the laser beam LY is oscillated by the rotation of polygon mirror 42Y for the main scanning for photoreceptor drum 1Y that rotates in the sub-scanning direction. Through this main scanning, an electrostatic latent image is written on the photoreceptor drum 1Y. The electrostatic latent image written on the photoreceptor drum 1Y is developed with toner member for Y-color image forming. A Y-color toner image on the photoreceptor drum 1Y is transferred onto intermediate transfer belt 6 that rotates in the sub-scanning direction (primary transfer).

Then, the number of pulses of MST-IDX1 signal is counted even in the course of Y-color image forming, and MVV signal rises at time t5 shown in FIG. 16(H) in order after the image forming start signal for M-color image forming shown in FIG. 16(G) (STT-M signal) rises based on MST-IDX1 signal, then, CVV signal shown in FIG. 16(J) rises at time t6 after the image forming start signal for C-color image forming shown in FIG. 16(I) (STT-C signal) rises based on MST-IDX1 signal, and KVV signal rises at time t7 shown in FIG. 16(L) after the image forming start signal for K-color image forming shown in FIG. 16(K) (STT-K signal) rises based on MST-IDX1 signal. The aforesaid processing is carried out even in each of image writing units 3M", 3C" and 3K" respectively for M-, C- and K-color image forming. When YVV signal falls at time t8 shown in FIG. 16(E) after Y-color image forming has been completed, control for changing a rotation speed and a phase is executed in image writing unit 3Y" based on YIDX signal shown in FIG. 16(F) for Y-color image forming on the rear face of a sheet.

Switching Between Front Face and Rear Face

In this example, CPU 55" outputs selection control signal SS1 to polygon drive CLK generating circuit 39" based on a sequence program, and executes control of rotation speed and phase of polygon mirror 42Y for Y-color based on MST-IDX1 signal or MST-IDX2 signal. For example, Y-CNTPRED signal and Y-PHASE signal are established for image writing unit 3Y" from CPU 55". In the image writing unit 3Y" on which the Y-CNTPRED signal and Y-PHASE signal are established, falling of YVV signal is detected at time t8 shown in FIG. 16(E) and selection control signal SS1 is started up to "H" level at time t9 shown in FIG. 16(b). This "H" level selection control signal SS1 is outputted from CPU 55" to polygon drive CLK generating circuits 39Y", 39M", 39C" and 39K" for respective colors, together with frequency control signal Sg.

In the polygon drive CLK generating circuits 39Y", if the examples shown in FIG. 11 and FIG. 12 are applied, phase difference P2' between MST-IDX1 or MST-IDX2 signal after magnification correction control and YIDX signal for Y-color image forming is calculated based on the aforesaid expression (3) by inputting therein counter output value N1 of YP-CLK signal before magnification correction control, counter output value N2 of YP-CLK signal after magnification correction control, phase difference P1' between a count base point of IDX counter circuit in pseudo index generating circuit 12', namely, rising time t21 of MST-IDX1 signal or MST-IDX2 signal and rising time t23 of YIDX signal for Y-color image forming, and phase control amount ΔP of polygon mirror 42Y.

Together with the foregoing, in the polygon drive CLK generating circuits 39Y", count base point E2' of counter circuit 43Y for the Y-color image forming on the rear face of a sheet (next page) before magnification correction control is calculated based on the aforesaid expression (4) by inputting therein phase difference A1' between rising time t21 of MST-IDX signal shown in FIG. 11(A), namely, a count base point of IDX counter circuit 401 and rising time t22 of YP-CLK signal shown in FIG. 11(D), namely, a count base point of IDX counter circuit 401 and a count base point of counter circuit 43Y for Y-color image forming, phase difference A2' between a count base point (time t31) of IDX counter circuit 401 shown in FIG. 12(B) and a count base point (time t32) of counter circuit 43Y for Y-color image forming and counter base point E1' for Y-color image forming before magnification correction control.

By the calculation stated above, rising timing of YP-CLK signal on the rear face of a sheet can be determined. In the polygon drive CLK generating circuits 39Y", YP-CLK signal for forming images on the rear face which has been created and phase-adjusted based on count base point E2' of counter circuit 43Y is outputted to polygon motor 36Y. The same processing of calculation is carried out even for each of other image writing units 3M", 3C" and 3K".

Image Forming on the Rear Face

In this example, in the case of image forming on the rear face of a sheet, CPU 55" starts up a signal of image forming on the rear face of a sheet (VTOP signal) based on MST-IDX2 signal, and counts the number of pulses of MST-IDX2 signal based on the VTOP signal to determine start timing for image forming on the rear face of a sheet based on the number of counted pulses. Further, processing of Y-color image forming on the rear face of a sheet is started after waiting for stabilizing time Ty" for the rotation of polygon mirror 42Y to be stabilized, from the change of rotation speed of polygon motor 36Y.

When MVV signal falls after M-color image forming is completed at time t10 shown in FIG. 16(H), rotation speed change and phase change are controlled in image writing unit 3M". In this example, M-color image forming on the rear face of a sheet is started at time t17 after waiting stabilizing time Tm" for the rotation of polygon mirror 42M to be stabilized, from the change of rotation speed of polygon motor 36M.

Further, when CVV signal falls after C-color image forming is completed at time t12 shown in FIG. 16(A), rotation speed changes and phase changes are controlled in image writing unit 3C". In this example, C-color image forming on the rear face of a sheet is started at time t18 after waiting for stabilizing time Tc" for the rotation of polygon mirror 42C to be stabilized, from the changes of the rotation speed of polygon motor 36C.

Further, when KVV signal falls after K-color image forming-is completed at time t16 shown in FIG. 16(L), rotation speed changes and phase changes are controlled in image writing unit 3K". In this example, K-color image forming on the rear face of a sheet is started at time t19 after waiting for stabilizing time Tk" for the rotation of polygon mirror 42k to be stabilized, from the changes of the rotation speed of polygon motor 36K.

As stated above, color copier 300 relating to the third example is equipped with pseudo IDX generating circuit 12', and rotation speed changes and phase changes of a polygon mirror in each color image forming before and after magnification correction are controlled simultaneously, based on MST-IDX1 signal and MST-IDX2 signal. Under this assumption, when Y-color image forming is a basis, phase difference P2' between MST-IDX1 signal or MST-IDX2 signal after magnification correction control and YIDX signal for Y-color image forming is calculated based on expression (3) in image writing unit 3Y" where Y-CNTPRED signal and Y-PHASE signal are set from CPU 55". Together with this, the image writing unit 3Y" is caused to calculate count base point E2' of counter circuit 43Y for the Y-color image forming after magnification correction control based on the expression (4) explained earlier. Calculation is carried out in the same way as in the foregoing, even for each of image writing units 3M"-3K".

Therefore, a period of stabilizing time for the rotation of each of polygon mirrors 42Y-42K to be stabilized can be shortened, compared with a conventional system, because both speed control and phase control can be executed simultaneously for each of polygon mirrors 42Y, 42M, 42C and 42K.

Owing to this, a decline of productivity of operations for magnification correction control can be restrained even in the case of applying MST-IDX1 signal and MST-IDX2 signal, which greatly contributes to continuous high speed processing actions for color images. In other words, even when executing operations for magnification correction control, the same productivity as in the occasion of executing no operations for magnification correction control can be secured, because image forming for a succeeding tray 2 can be started after waiting for a fixed stabilizing time from a termination of image forming for the tray 1.

Possibility of Utilization in the Industrial World

The present invention can be applied extremely preferably to a black and white and color digital multifunctional machine equipped with copying functions, facsimile functions and printer functions and to a copier.

In the first embodiment of the image forming apparatus relating to the invention, there is provided a controller that executes simultaneously control for changing rotation speed of the polygonal mirror rotator for changing image size in the sub-scanning direction and control for correcting a correction amount for color registration error depending on correction of magnification for image sizes, and for adjusting a rotating phase of the polygonal mirror rotator depending on a correction amount for color registration error after the correction, when forming images by correcting magnification in terms of image sizes by one page unit.

Owing to this configuration, it is possible to shorten a stabilizing time during which the rotation of the polygonal mirror rotator is stabilized, compared with an occasion wherein speed control and phase control of the polygonal mirror rotator are carried out in succession. Due to this, a decline of productivity in correcting operations for image sizes can be controlled, which contributes greatly to continuous high speed processing of color images.

In the second embodiment of the image forming apparatus relating to the invention, there is provided a controller having a calculating section for correcting image sizes by one page unit, and this calculating section calculates a rising edge and a falling edge of drive clock signals that control a rotation speed of the polygonal mirror rotator for the succeeding page based on an amount of phase control calculated by correcting an amount of correction of color registration errors depending on an amount of magnification adjustment, an output value of a counter that is provided independently of each color for; determining a cycle of drive clock signal and is controlled independently, a phase difference between the first main scanning basis signal immediately before conducting magnification correction for image sizes and the second main scanning basis signal and on a phase difference between a base point of a count cycle of the counter for generating drive clock signal of the polygonal mirror rotator and a base point of a count cycle under the condition of count cycle after correction of magnification for image size.

Owing to this configuration, it is possible to shorten stabilizing time during which a rotation of the polygonal mirror rotator is stabilized, because speed control and phase control of the polygonal mirror rotator can be carried out simultaneously, compared with a conventional method. Due to this, a decline of productivity in correcting operations for image sizes can be controlled, which contributes greatly to continuous high speed processing of color images.

In the third embodiment of the image forming apparatus relating to the invention, there is provided a controller having a calculating section for correcting image sizes by one page unit, and this calculating section calculates a rising edge and a falling edge of drive clock signals that control a rotation speed of the polygonal mirror rotator for the succeeding page based on an amount of phase control calculated by correcting an amount of correction of color registration errors depending on an amount of magnification adjustment, an output value of a counter that is provided independently of each color for determining a cycle of drive clock signal and is controlled independently, a phase difference between the first main scanning basis signal immediately before conducting magnification correction for image sizes and the second main scanning basis signal and on a phase difference between a base point of a count cycle for generating pseudo index signals and a base point of a counter cycle for generating drive clock signals of the polygonal mirror rotator for each color unit.

Owing to this configuration, it is possible to shorten stabilizing time during which a rotation of the polygonal mirror rotator is stabilized, because speed control and phase control of the polygonal mirror rotator can be carried out simultaneously, compared with a conventional method. Due to this, a decline of productivity in correcting operations for image sizes can be controlled, which contributes greatly to continuous high speed processing of color images.

What is claimed is:

1. An image forming apparatus for forming color images comprising at least two or more colors, having a function of magnification correction of image size by one page unit, the image forming apparatus comprising:
    an image carrier;
    a polygonal mirror rotator independently provided for each color, wherein a latent image is formed by an exposure beam scanned by the polygonal mirror rotator and the latent image is developed to be a color image; and
    a controller which conducts first control for changing rotation speed of the polygonal mirror rotator in order for changing image size in a sub-scanning direction perpendicular to a main scanning direction, and second control for correcting a correction amount for color registration error depending on magnification correction of image size, and for adjusting a rotating phase of the polygonal mirror rotator depending on the corrected correction amount for color registration error;
    where the main scanning direction is a direction in which the image carrier is scanned with an exposure beam coming from the polygonal mirror rotator
    wherein the controller conducts the second control simultaneously with the first control, not by waiting until the rotation speed of the polygonal mirror rotator stabilizes after an execution of the first control;
    wherein the controller comprises:
        a color registration error detecting section which detects color registration error on each color image formed on the image carrier;
        a color registration error correcting section which corrects the color registration error depending on an amount of the color registration error obtained from the color registration error detecting section;
        an oscillator which generates a basis clock signal;
        a counter which is provided and independently controlled for each color and which counts the basis clock signal to determine a drive clock signal that controls a rotation speed of the polygonal mirror rotator; and
        a calculating section which executes (1) and (2) below:
            (1) calculation of a count cycle of the counter corresponding to a cycle of the drive clock signal for controlling the rotation speed of the polygonal mirror rotator based on the magnification correction of image size;
            (2) calculation of counter values corresponding to a rising edge and a falling edge of a drive clock signal controlling a rotation speed of the polygonal mirror rotator for a succeeding page, based on an amount of phase control calculated by correcting an amount of color registration error correction after correction by the color registration error correcting section depending on an amount of magnification correction,
        on an output value of the counter provided and independently controlled for each color to determine a drive clock signal cycle that controls a rotation speed of the polygonal mirror rotator,
        on a phase difference between a first main scanning basis signal generated by detecting an exposure beam scanned by the polygonal rotator for a first color image forming unit immediately before conducting magnification correction for image sizes with a sensor arranged in a scanning optical path and the second main scanning basis signal generated by detecting an exposure beam scanned by the polygonal rotator for a second color image forming unit with a sensor arranged in a scanning optical path,
        and on a phase difference between a first base point difference and a second base point difference, wherein the first base point difference is a difference between a count cycle base points of the counter for generating a drive clock signal of the polygonal mirror rotator of the first and second color image forming units immediately before conducting magnification correction for image size and the second base point difference is the difference of the count cycle base point after the magnification correction for image size,
    wherein the controller executes polygonal mirror rotator drive control in a case of magnification correction for image sizes by the drive clock signal, which is generated based on the calculated drive clock signal cycle and the calculated counter values corresponding to the rising edge and the falling edge of the drive clock signal.

2. The image forming apparatus of claim 1, wherein the controller executes a rotational phase control of the polygon mirror rotator with a basis of the counter for generating a drive clock signal of the polygonal mirror rotator for the first color image forming unit.

3. The image forming apparatus of claim 1, further comprising a magnification correction section to correct an image size by one page unit, wherein the magnification correction section comprises:
    a rotation speed changing section to change the rotation speed of the polygonal mirror rotator according to a magnification adjusting amount in a sub-scanning direction; and a pixel clock frequency changing section to change a pixel clock frequency according to a rotation speed-changing amount of the polygonal mirror rotator and to a magnification adjusting amount in a main-scanning direction.

4. The image forming apparatus of claim 1, further comprising a yellow color image forming unit, a magenta color image forming unit, a cyan color image forming unit, and a black color image forming unit.

5. The image forming apparatus of claim 1, further comprising an intermediate transfer belt, wherein color images made on the image carrier are transferred to form superposed color images onto the intermediate transfer belt, and the superposed color images are collectively transferred onto a recording sheet.

* * * * *